US012306556B2

(12) United States Patent
Iwanaga

(10) Patent No.: US 12,306,556 B2
(45) Date of Patent: May 20, 2025

(54) IMAGE FORMING APPARATUS

(71) Applicant: CANON KABUSHIKI KAISHA, Tokyo (JP)

(72) Inventor: Ayumu Iwanaga, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/480,434

(22) Filed: Oct. 3, 2023

(65) Prior Publication Data

US 2024/0160126 A1 May 16, 2024

(30) Foreign Application Priority Data

Nov. 11, 2022 (JP) ................................. 2022-181461

(51) Int. Cl.
*G03G 15/08* (2006.01)

(52) U.S. Cl.
CPC ................................ *G03G 15/0886* (2013.01)

(58) Field of Classification Search
CPC ........... G03G 21/1647; G03G 21/1853; G03G 15/0886; G03G 15/5054; G03G 2221/1684
See application file for complete search history.

(56) References Cited

U.S. PATENT DOCUMENTS

| | | | | |
|---|---|---|---|---|
| 5,625,857 | A | 4/1997 | Shimada et al. | 399/49 |
| 2009/0180803 | A1 | 7/2009 | Tomita et al. | 399/121 |
| 2014/0294420 | A1* | 10/2014 | Lee | G03G 21/0005 399/74 |
| 2020/0026218 | A1* | 1/2020 | Tajima | G03G 15/0848 |
| 2020/0026236 | A1 | 1/2020 | Shigihara | G06G 21/206 |

FOREIGN PATENT DOCUMENTS

| | | |
|---|---|---|
| JP | H07-225501 | 8/1995 |
| JP | 2009-168888 | 7/2009 |
| JP | 2010-139748 | 6/2010 |
| JP | 2020-013033 | 1/2020 |

* cited by examiner

*Primary Examiner* — Jessica L Eley
(74) *Attorney, Agent, or Firm* — Venerable LLP

(57) ABSTRACT

An image forming apparatus includes a sensor detecting a toner image carried on a surface of a moving member, a shutter, a shutter mounting portion and an urging member. The shutter is movably supported between the sensor and the surface of the moving member, and movable to an opening position where the sensor is exposed to the surface of the moving member and a closing position where the sensor is covered to the surface of the moving member. The shutter mounting portion is demountably mounted with the shutter and movable integrally with the shutter in a case in which the shutter is mounted. The urging member urges the shutter mounting portion.

11 Claims, 17 Drawing Sheets

IMAGE FORMING APPARATUS

FIELD OF THE INVENTION AND RELATED ART

The present invention relates to an image forming apparatus such as a copier, a printer, or a facsimile device using an electrographic method or an electrostatic recording method, or a multifunction printer provided with a plurality of these functions.

Conventionally, for example, an image forming apparatus such as a copier using the electrographic method etc. may be provided with a sensor unit which includes a sensor that detects a toner image as a detection target on a moving member such as an intermediary transfer belt, and a holding body which accommodates the sensor (Japanese Laid-Open Patent Application (JP-A) 2020-13033). Further, in order to suppress contamination of a detecting surface of the sensor by toner scattered from an image formed on the moving member, the sensor unit may be provided with a shutter member which can cover the detecting surface of the sensor to a surface of the moving member. The shutter member is movably accommodated by the holding body described above.

Here, an opening/closing mechanism, which moves the shutter member of the sensor unit to an opening position where the detecting surface of the sensor is exposed to the surface of the moving member, and to a closing position where the detecting surface of the sensor is covered to the surface of the moving member, may have the following configuration. That is, the configuration is such that, while the shutter member is urged by an elastic member from the opening position in a direction toward the closing position, the shutter member is moved from the opening position to the closing position against an urging force of an urging member by a driving source at a predetermined timing.

However, because conventionally, the configuration is such that one end portion of the elastic member which urges the shutter member is mounted on the shutter member, and the other end portion of the elastic member is mounted on the holding body described above, the following issues were found.

That is, by providing the shutter member on the sensor unit, contamination of the detecting surface of the sensor by toner can be suppressed. However, it is difficult to prevent gradual fouling of the detecting surface of the sensor by toner; therefore, for example, it is necessary to clean the detecting surface of the sensor on a regular basis. Also, when performing the aforementioned cleaning, it is necessary to expose the detecting surface of the sensor, which requires the shutter member to be demounted from the holding body. At this time, in a case in which, as described above, one end portion of the elastic member which urges the shutter member is mounted on the shutter member, it is necessary to demount one end portion of the elastic member from the shutter member and remount it each time cleaning is performed. Such demounting and remounting of the elastic member may lead to a decrease in workability (work efficiency) due to an increase in the number of processes.

Incidentally, the same can be said for a case in which the sensor needs to be replaced and replacement work is required.

SUMMARY OF THE INVENTION

Therefore, the purpose of the present invention is to improve workability for accessing the sensor which detects the toner image.

The above purpose is achieved by the image forming apparatus according to the present invention. In summary, according to an aspect of the present invention, there is provided an image forming apparatus comprising: a moving member configured to carry a toner image and move; a sensor configured to detect the toner image carried on a surface of the moving member; a shutter movably supported between the sensor and the surface of the moving member, and movable to an opening position where the sensor is exposed to the surface of the moving member and a closing position where the sensor is covered to the surface of the moving member; a driving source configured to generate a driving force to cause the shutter to move between the opening position and the closing position; a shutter mounting portion demountably mounted with the shutter and movable integrally with the shutter in a case in which the shutter is mounted; and an urging member configured to urge the shutter mounting portion.

Further features of the present invention will become apparent from the following description of exemplary embodiments with reference to the attached drawings.

DESCRIPTION OF THE EMBODIMENTS

In the following, embodiments of an image forming apparatus of the present invention will be specifically described with reference to Figures.

Embodiment 1

1. Overall Configuration and Operation of Image Forming Apparatus

Figure 1:
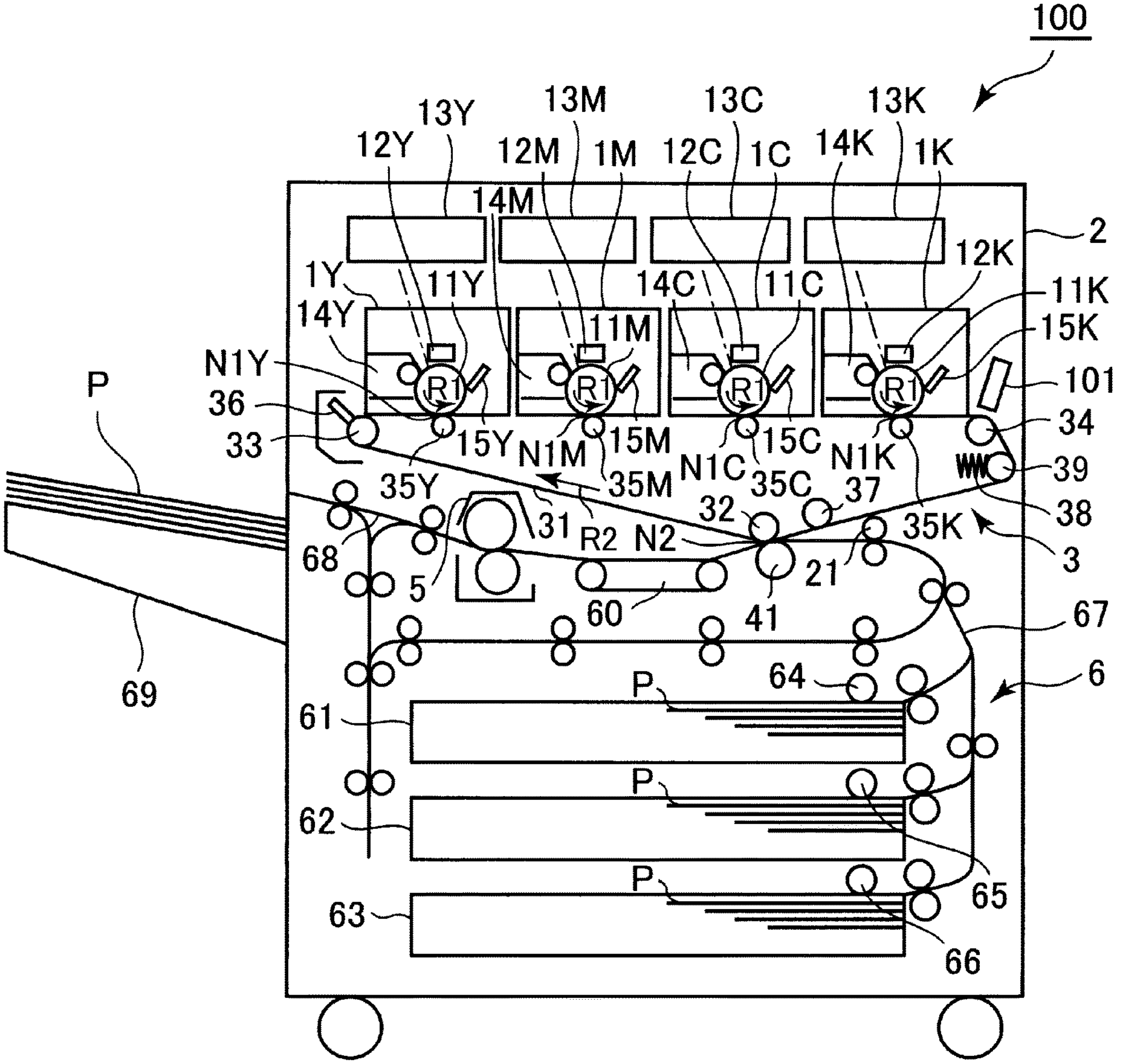
FIG. 1 is a cross-sectional schematic view of an image forming apparatus.

FIG. 1 is a cross-sectional schematic view of an image forming apparatus 100 of the present embodiment. The image forming apparatus 100 of the present embodiment is a tandem-type printer which adopts an intermediary transfer method that can form a full-color image using an electrographic method. The image forming apparatus 100 can form the image on a sheet-form recording material P corresponding to image data (an image signal) obtained from an external device, such as an image reading device or a personal computer, and print.

The image forming apparatus 100 includes four image forming portions (image forming units) 1Y, 1M, 1C, and 1K which respectively form each color toner image for yellow (Y), magenta (M), cyan (C), and black (K) as a plurality of image forming portions. The four image forming portions 1Y, 1M, 1C, and 1K are disposed in series along a moving direction of an image transfer surface which is disposed approximately horizontally to an intermediary transfer belt 31 which will be described later. For the same element including the same or corresponding function or configuration provided for each color, end reference numerals Y, M, C, and K, which represent an element for any one color, may be omitted and described collectively. In the present embodiment, the image forming portions 1 are configured to include photosensitive drums 11 which will be described later, charging devices 12, exposure devices 13, developing devices 14, and drum cleaning devices 15 etc.

The photosensitive drums 11, which are rotatable drum-type (cylindrical) photosensitive members (electrophotographic photosensitive members) as first image bearing members, are rotatably driven by a driving motor (not shown) as a driving means in a direction of an arrow R1 (counter-clockwise direction) shown in the Figure. A surface (an outer circumferential surface) of the rotating photosensitive drums 11 is uniformly charge-processed to a predetermined electric potential (negative polarity in the present embodiment) by the charging devices 12 as charging means. The surface of the charge-processed photosensitive drums 11 is irradiated by a laser light corresponding to image data by the exposure devices (laser scanner devices) 13 as exposure means and is scan exposed, forming an electrostatic latent image (an electrostatic image) on the photosensitive drums 11 corresponding to image data. Toner as developer is supplied to the developing devices 14 as developing means and the electrostatic latent image formed on the photosensitive drums 11 is developed (visualized), forming the toner image (developer image) on the photosensitive drums 11. In the present embodiment, toner that is charged to the same charge polarity as the photosensitive drums 11 (negative polarity in the present embodiment) is fixed to an exposure portion (an image portion) on the photosensitive drums 11 whose absolute electric potential value has been decreased by being exposed after being uniformly charge-processed. In the present embodiment, a normal charge polarity of toner, which is the main charge polarity of toner during development, is negative polarity.

The intermediary transfer belt 31, which is an intermediary transfer member constituted by an endless belt as a second image bearing member, is disposed facing the four photosensitive drums 11Y, 11M, 11C, and 11K. The intermediary transfer belt 31 is stretched across a driving roller 33 as a plurality of stretching rollers, a backup roller 34, a tension roller 39, a secondary pre-transfer roller 37, and a secondary transfer inner roller 32. The driving roller 33 is rotatably driven by a driving motor (not shown) as a driving means which transmits a driving force to the intermediary transfer belt 31, and the intermediary transfer belt 31 rotates (orbits) in a direction of an arrow R2 (clockwise direction) shown in the Figure. The tension roller 39 is pressed on both end portions of a rotational axis direction by a tension spring 38 constituted by a compressed coil spring, which is an elastic member as an urging means, in a direction going from the inner circumferential surface side of the intermediary transfer belt 31 toward the outer circumferential surface side of the intermediary transfer belt 31. As a result, the tension roller 39 adds a predetermined tension to the intermediary transfer belt 31. Primary transfer rollers 35Y, 35M, 35C, and 35K, which are roller-type primary transfer members as primary transfer means corresponding to each of the photosensitive drums 11Y, 11M, 11C, and 11K, are respectively disposed on the inner circumferential surface side of the intermediary transfer belt 31. The primary transfer rollers 35 are pressed toward the photosensitive drums 11 and contact the photosensitive drums 11 via the intermediary transfer belt 31, then form primary transfer portions (primary transfer nip portions) N1, which are contact portions between the photosensitive drums 11 and the intermediary transfer belt 31. The stretching rollers other than the driving roller 33 and each of the primary transfer rollers 35 are driven with the rotation of the intermediary transfer belt 31. The toner image formed on the photosensitive drums 11 is transferred (primary transferred) in the primary transfer portions N1 onto the rotating intermediary transfer belt 31. During primary transfer, a primary transfer voltage (a primary transfer bias), which is the opposite polarity of the normal charging polarity of the toner (positive polarity in the present embodiment), is applied to the primary transfer rollers 35. For example, during formation of the full-color image, the toner image for each color, Y, M, C, and K, which are formed on each of the photosensitive drums 11, are sequentially transferred to each of the primary transfer portions N1 superimposed in the same image position on the intermediary transfer belt 31.

A secondary transfer outer roller (a secondary transfer roller) 41, which is a roller-type secondary transfer member as a secondary transfer means, is disposed on the outer circumferential surface side of the intermediary transfer belt 31 in a position facing the secondary transfer inner roller (a secondary transfer opposing roller) 32. The secondary transfer outer roller 41 is pressed toward the secondary transfer inner roller 32 and contacts the secondary transfer inner roller 32 via the intermediary transfer belt 31, then forms secondary transfer portions (secondary transfer nip portions) N2, which are contact portions between the intermediary transfer belt 31 and the secondary transfer outer roller 41. The secondary transfer outer roller 41 is driven with the rotation of the intermediary transfer belt 31. The toner image formed on the intermediary transfer belt 31 is transferred (secondary transferred) onto the recording material P which is nipped between the intermediary transfer belt 31 and the secondary transfer outer roller 41 on the secondary transfer portions N2 and conveyed. During secondary transfer, a secondary transfer voltage (a secondary transfer bias), which is the opposite polarity of the normal charging polarity of the toner (positive polarity in the present embodiment), is applied to the secondary transfer outer roller 41. The secondary transfer inner roller 32 is connected to a ground potential. Incidentally, the configuration can be such that a secondary transfer voltage which is the same polarity as the normal charging polarity of the toner can be applied to the secondary transfer inner roller 32, and the secondary transfer outer roller 41 is connected to the ground potential. The recording material (a recording medium, a transfer material, or a sheet) P such as paper is fed from a feeding portion 6 and supplied to the secondary transfer portions N2. That is, the recording material P is stored in cassettes 61, 62, and 63 as recording material storage portions of the feeding portion 6. The recording material P stored in the cassettes 61, 62, and 63 is ejected from any one of the cassettes 61, 62, and 63 by the rotation of any one of the feeding rollers 64, 65, and 66 as feeding members of the feeding portion 6. The recording material P is conveyed to a registration roller 21 as a conveyance member via a feeding conveyance passage 67. The registration roller 21 conveys the recording material P to the secondary transfer portions N2 by synchronizing the timing with the toner image formed on the intermediary transfer belt 31.

The recording material P onto which the toner image has been transferred is conveyed to a fixing device (a thermal fixing device) 5 as a fixing means to a conveyance belt 60 as a conveyance member. By heating and pressing the recording material P which bears the unfixed toner image, the fixing device 5 fixes (melts, fastens) the toner image onto the surface of the recording material P. The recording material P onto which the toner image has been fixed is discharged (outputted) to a discharge tray 69 as an output portion provided on the exterior of the main assembly (hereinafter referred to as "main assembly") 2 of the image forming apparatus 100 via a discharge conveyance path 68.

On the other hand, toner remaining on the photosensitive drums 11 after the primary transfer (primary transfer residual toner) is removed from the photosensitive drums 11 by the drum cleaning devices 15 as photosensitive member cleaning means and collected. Further, deposits such as toner remaining on the intermediary transfer belt 31 after the secondary transfer (secondary transfer residual toner) are removed from the intermediary transfer belt 31 by a belt cleaning device 36 as an intermediary transfer member cleaning means and collected.

Incidentally, a laser light source whose light emission is controlled according to the image signal and an optical component such as a mirror which guides the laser light from the laser light source to the photosensitive drums 11 are provided on the exposure devices 13. Adjusting the timing of the light emission of the laser light and the disposition of the mirror etc. allows the timing of the image writing to be adjusted, and it is possible to adjust the image position for each color. Further, adjusting the electric potential of the photosensitive drums 11 and the quantity of the laser light source allows the image density of each color to be adjusted.

Further, the image forming apparatus 100 includes a sensor unit 101 which is disposed further downstream than the primary transfer portion N1K which is the farthest downstream in the moving direction of the surface of the intermediary transfer belt 31, and which is disposed facing the surface (the outer circumferential surface) of the intermediary transfer belt 31 which is farther upstream than the secondary transfer portions N2. The sensor unit 101 includes registration sensors 113 and density sensors 114 (FIGS. 2 and 6), which are optical sensors. The backup roller 34 is disposed in a position facing the sensor unit 101 on the inner circumferential surface of the intermediary transfer belt 31. The sensor unit 101 will be described in more detail later.

Further, in the present embodiment, in each of the image forming portions 1, the photosensitive drums 11, the charging devices 12, the developing devices 14, and the drum cleaning devices 15 constitute a cartridge (a process cartridge) which is integrally demountable from the main assembly 2. Further, in the present embodiment, the intermediary transfer belt 31, a plurality of stretching rollers on the intermediary transfer belt 31, each of the primary transfer rollers 35, the belt cleaning device 36, and a frame which supports these parts etc. constitute a belt unit 3 which is integrally demountable from the main assembly 2.

2. Control Portion

Figure 2:
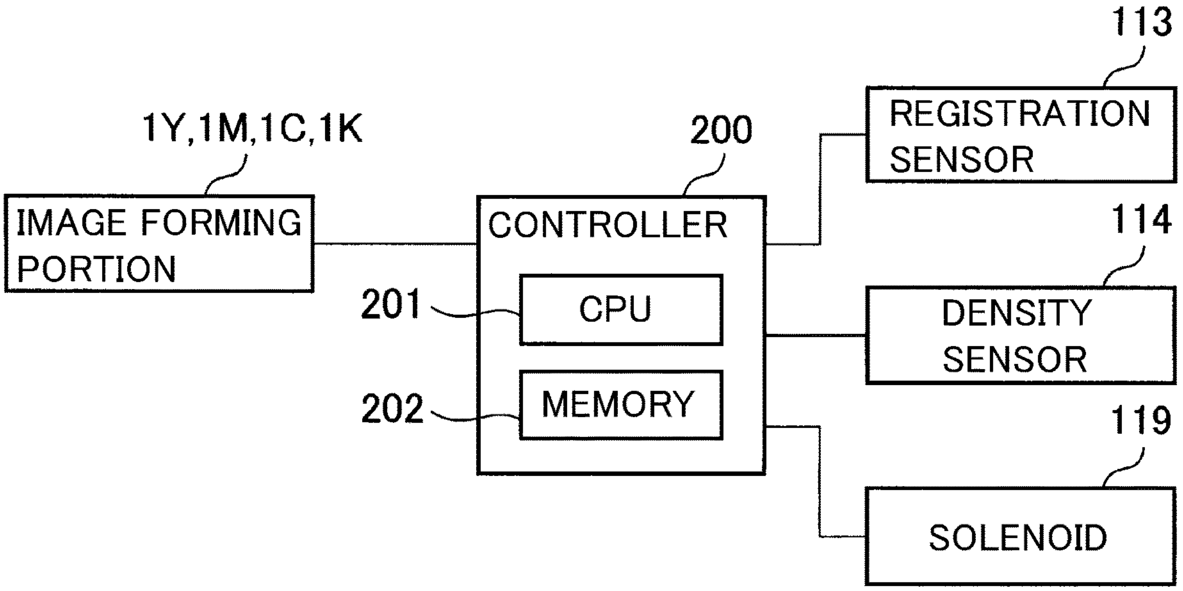
FIG. 2 is a schematic block diagram showing a control mechanism of the image forming apparatus.

FIG. 2 is a schematic block diagram showing a control mechanism of the image forming apparatus 100 in the present embodiment. A control portion 200 as a control means provided on the image forming apparatus 100 is configured to include a CPU 201 which is a central element that performs calculations, a memory 202 which is a memory element such as a ROM and a RAM. Detection results and calculation results etc. of the sensors are stored in the RAM, while control programs and data tables requested etc. in advance are stored in the ROM. The control portion 200 collectively controls each portion of the image forming apparatus 100. The control portion 200 is, for example, connected to the image forming portions 1Y, 1M, 1C, and 1K, the registration sensors 113 of the sensor unit 101, density sensors 114, and a solenoid 119 which will be described later. The control portion 200 corrects the operation of the image forming portions 1Y, 1M, 1C, and 1K based on the detection results of the registration sensors 113 and density sensors 114 of the sensor unit 101, and executes the control of the adjustment of the image position of each color and the adjustment of the image density of each color. Further, the control portion 200 executes the control of the driving of the solenoid 119, which will be described later, etc. of the sensor unit 101.

3. Sensor Unit

Next, the sensor unit 101 in the present embodiment will be described. Incidentally, in the following description, for the image forming apparatus 100 and its elements, the front side of the drawing sheet in FIG. 1 is the front side, while the back side of the drawing sheet in FIG. 1 is the back side. Further, regarding the image forming apparatus 100 and its elements, the left side and the right side, as seen from the aforementioned front side, are respectively the left side and the right side. The direction connecting the front side and the back side of the image forming apparatus 100 shall be approximately parallel to the rotational axis direction of the photosensitive drums 11. Further, the vertical direction refers to the vertical direction in the gravity direction (the vertical direction); however, it does not only signify immediately above and immediately below, but also includes above and below a horizontal plane passing through the respective elements and positions of interest.

Figure 3:
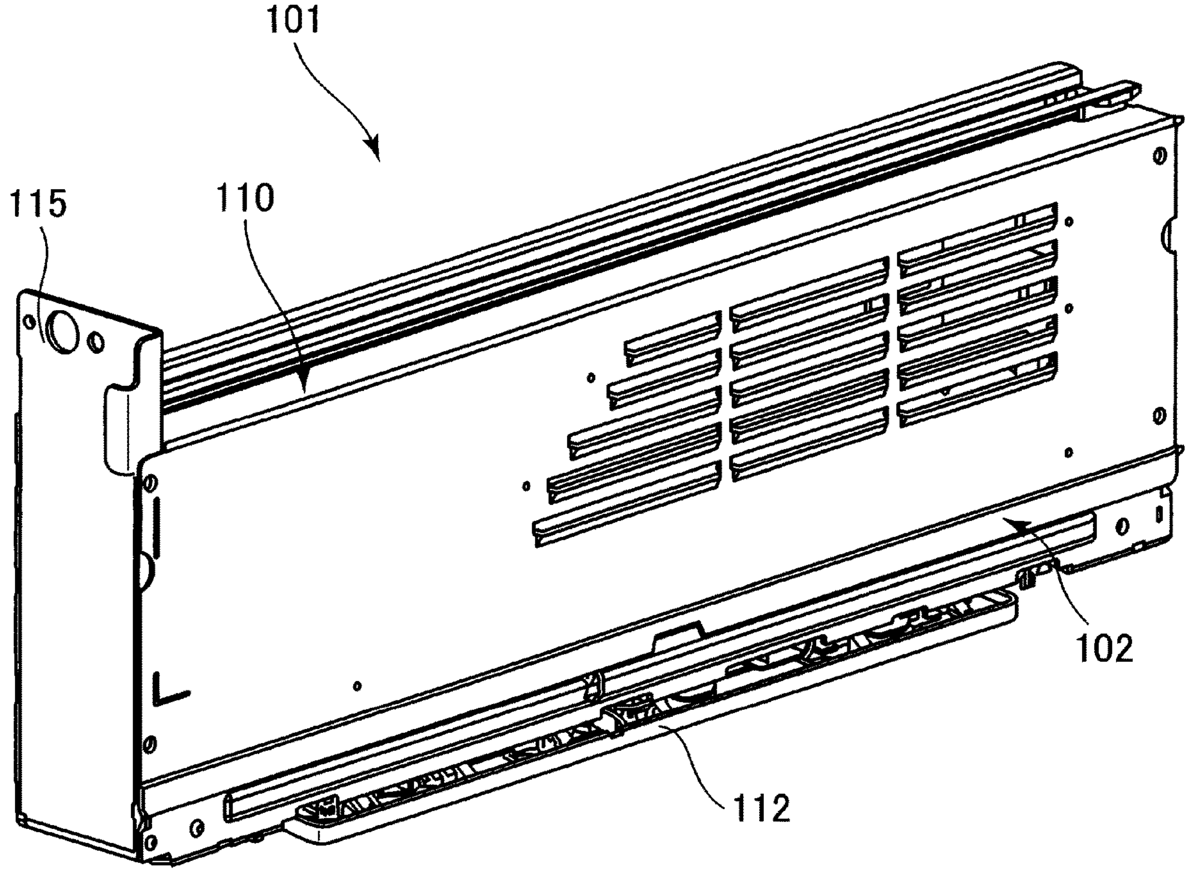
FIG. 3 is an external perspective view of a sensor unit.
Figure 4:
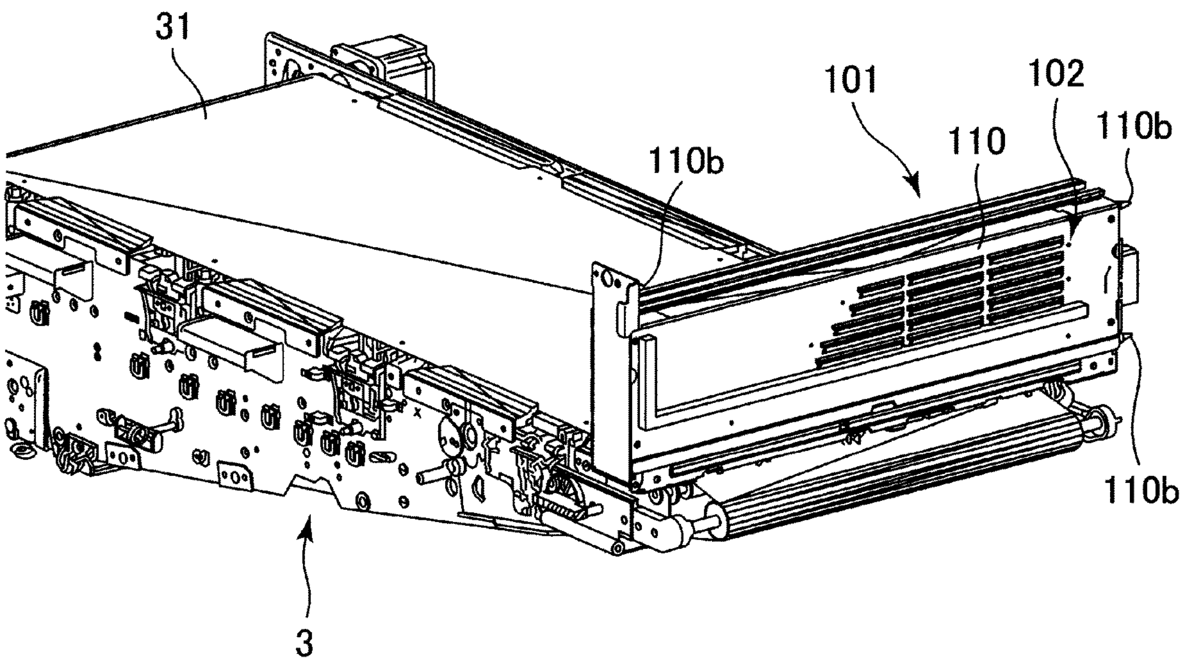
FIG. 4 is an external perspective view of the sensor unit and a belt unit.
Figure 5:
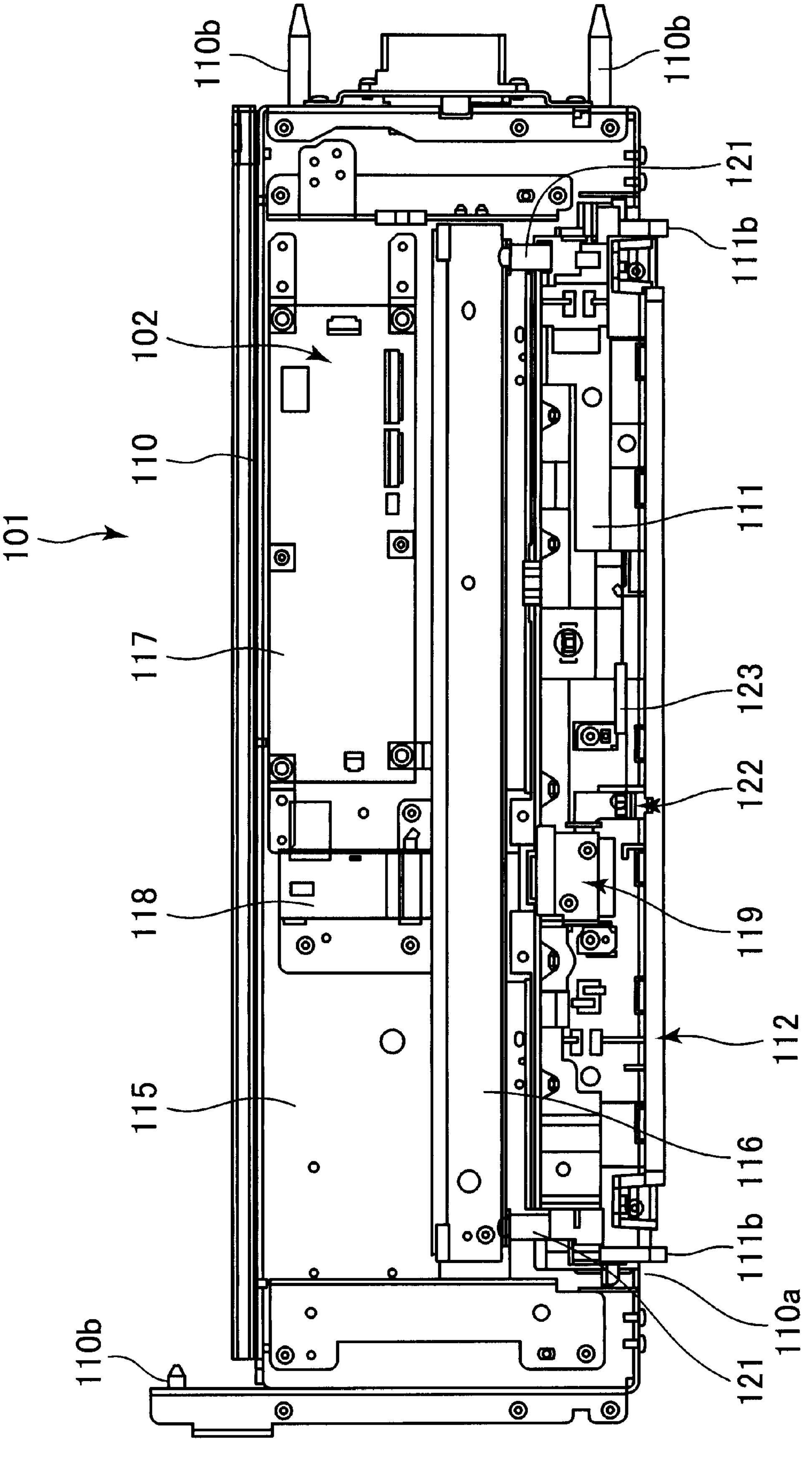
FIG. 5 is a side view of the inside of the sensor unit.
Figure 6:
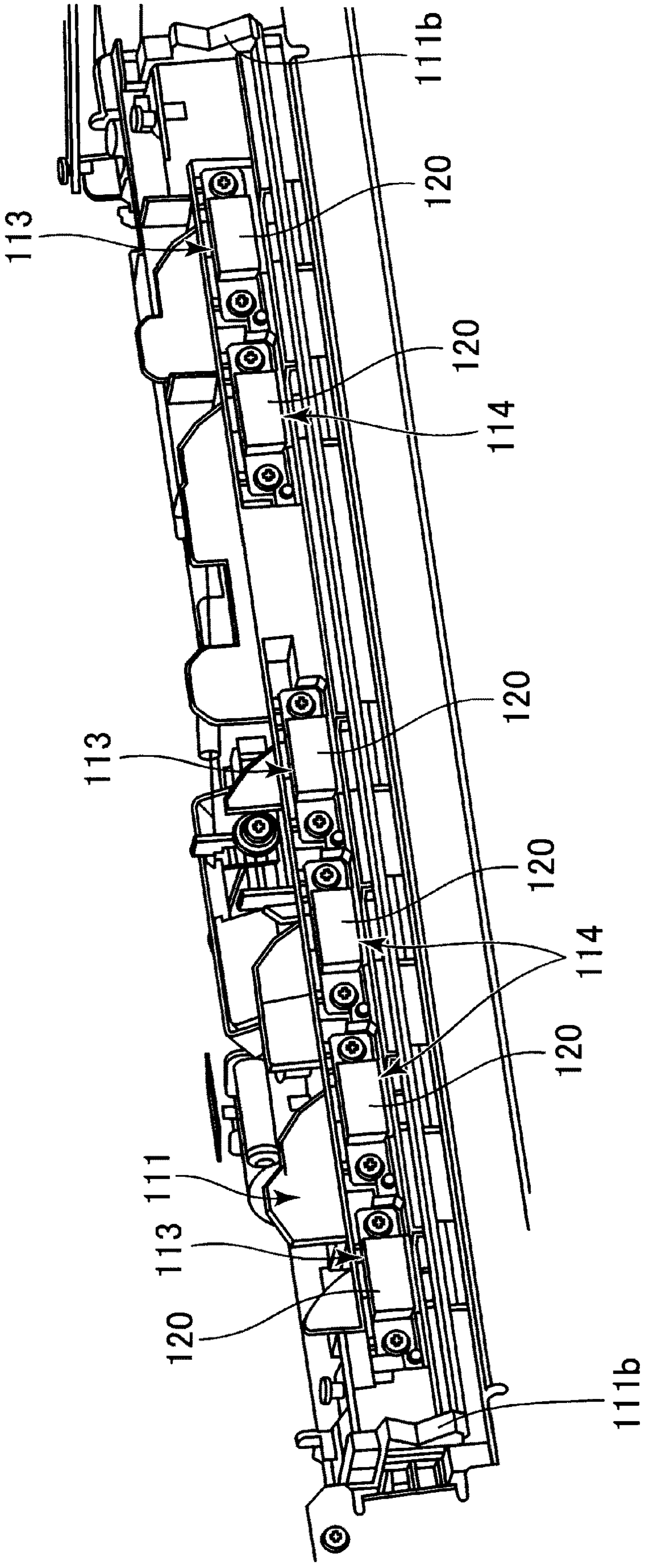
FIG. 6 is a perspective view of a holding member.

FIG. 3 is an external perspective view of the sensor unit 101, as seen from the front right side. FIG. 4 is a perspective view of the sensor unit 101 and a portion of the belt unit 3, as seen from the front right side. FIG. 5 is a side view of the inside of a casing 110, which will be described later, of the sensor unit 101, as seen from the right side. FIG. 6 is a perspective view of a holding member 111, which will be described later, of the sensor unit 101, as seen from detecting surfaces 120 (from the intermediary transfer belt 31) of the registration sensors 113 and the density sensors 114.

Roughly divided, the sensor unit 101 is configured to include the casing 110, the registration sensors 113 and the density sensors 114, the holding member 111, and a shutter member 112. The casing 110 as a support portion constitutes the outer frame of the sensor unit 101. As a plurality of sensors, the registration sensors 113 and the density sensors 114 detect a registration patch and a density patch, both of which will be described later, which are respectively detection targets on the surface of the intermediary transfer belt 31 as moving members (conveyance members). The holding member 111 is supported by a frame 115 which constitutes the casing 110, and accommodates the registration sensors 113, the density sensors 114, the shutter member 112, the solenoid 119 which will be described later, and a shutter spring 123 etc. A holding body 102 is constituted by the casing 110 which is constituted by the frame 115 etc., a holding member support plate 116 which will be described later, which is fixed by the frame 115, and the holding member 111 which is supported by the frame 115 via the holding member support plate 116. The holding body 102 accommodates the registration sensors 113, the density sensors 114, the shutter member 112, the solenoid 119 which will be described later, and the shutter spring 123 which will be described later, etc. Each configuration will be described in detail below.

<Casing>

The casing 110, as shown in FIGS. 3 and 4, includes a long box-shape in the direction (the width direction of the intermediary transfer belt 31) intersecting (approximately perpendicular in the present embodiment) the moving direction of the surface of the intermediary transfer belt 31. The casing 110 is configured with the frame 115, which is used to fix the sensor unit 101 to the main assembly 2 of the image forming apparatus 100, as the base. The holding member support plate 116, an electric board 117, and a fan 118 etc. are fixed to the inside of the frame 115, as shown in FIG. 5. The holding member support plate 116 supports the holding member 111. Under the control of the control portion 200, the electric board 117 processes an electric signal received between the registration sensors 113, the density sensors 114, the fan 118, and the solenoid 119 which will be described later. Further, as shown in FIG. 5, an opening portion 110*a* is provided on the lower surface of the casing 110 so that the detecting surfaces 120 (FIG. 6) of the registration sensors 113 and the density sensors 114, which are accommodated by the holding member 111, can be exposed to the surface of the intermediary transfer belt 31.

Incidentally, in the present embodiment, the fan 118 is provided to be anti-fouling for the registration sensors 113 and the density sensors 114 to prevent stains from toner etc. from adhering to the detecting surfaces 120 (FIG. 6) of the registration sensors 113 and the density sensors 114 due to air flow. The sensor unit 101 is configured to blow air sent from the fan 118 through the detecting surfaces 120 (FIG. 6) of the registration sensors 113 and the density sensors 114 and out from detection opening portions 124 of a slide shutter 112*a* (FIG. 8) which will be described later.

Here, in the present embodiment, the sensor unit 101 (the holding body 102) is configured to be demountable from the main assembly 2. In the present embodiment, the sensor unit 101 is mounted on the main assembly 2 by inserting the sensor unit 101 from the front side of the main assembly 2 toward the back side of the main assembly 2; conversely, the sensor unit 101 is demounted from the main assembly 2 by extracting the sensor unit 101 from the back side of the main assembly 2 toward the front side of the main assembly 2. When the sensor unit 101 is mounted on the main assembly 2, unit side positioning portions 110*b* (FIGS. 4 and 5), which are provided on the frame 115 of the casing 110 in the sensor unit 101, are fitted to positioning portions (not shown) on the main assembly side which are provided on the frame of the main assembly 2. The position of the sensor unit 101 on the main assembly 2 is determined in this way, and the sensor unit 101 is fixed to the main assembly 2. At this time, the sensor unit 101 is positioned in a position in which the detecting surfaces 120 (FIG. 6) of the registration sensors 113 and the density sensors 114 face the surface of the intermediary transfer belt 31.

<Sensors>

With reference to FIG. 6, the registration sensors 113 and the density sensors 114 are sensors which detect the toner image as a detection target on the surface of the intermediary transfer belt 31. In the present embodiment, the registration sensors 113 and the density sensors 114 are respectively constituted by reflective optical sensors. The registration sensors 113 and the density sensors 114 respectively include a light emitting portion which irradiates light toward the surface of the intermediary transfer belt 31, a light receiving portion which receives light from the light emitting portion reflected from the surface of the intermediary transfer belt 31 or from the toner image on the intermediary transfer belt 31, and a storage portion which stores these portions. A cover member constituted by glass and synthetic resin, which permit light (irradiated light, reflected light) from the aforementioned light emitting portion, is provided on a side surface which faces the surface of the intermediary transfer belt 31 of the storage portion. The registration sensors 113 and the density sensors 114 respectively include the detecting surfaces (detecting portions) 120 which face the surface of the intermediary transfer belt 31 at least when detecting the toner image. In the present embodiment, the detecting surfaces 120 is constituted by the surface of the aforementioned cover member. The registration sensors 113 are optical sensors which read a reference image for color misregistration correction (also referred to here as "registration patch"), which is the toner image formed on the intermediary transfer belt 31. The density sensors 114 are optical sensors which read the reference image for density correction (also referred to here as "density patch"), which is the toner image formed on the intermediary transfer belt 31.

As shown in FIG. 6, three registration sensors 113 are disposed in the width direction of the intermediary transfer belt 31. The control portion 200 then calculates the misregistration amount for each color based on the detection results of the registration patch from the registration sensors 113 for each color of yellow, magenta, cyan, and black. The calculated misregistration amount refers to the misregistration amount caused by a plurality of factors, including the conveyance direction of the intermediary transfer belt 31, the direction perpendicular to the conveyance direction, and an inclination of the plane etc. The calculated misregistration amount is fedback to the image (control of the image forming portions 1) which is processed by the control portion 200 and outputted.

Further, as shown in FIG. 6, three density sensors 114 are disposed in the width direction of the intermediary transfer belt 31. Based on the detection results of the density patch from the density sensors 114 for each color of yellow, magenta, cyan, and black, a density adjustment amount is then calculated by the control portion 200 to adjust the density of the image for each color so that they are suitable for the image to be outputted. The calculated density adjustment amount is fedback to the image (control of the image forming portions 1) which is processed by the control portion 200 and outputted.

Incidentally, in the present embodiment, a plurality of the registration sensors 113 and the density sensors 114 are respectively disposed; however, the number of the registration sensors 113 and the density sensors 114 is not limited in the present embodiment. At least one sensor can be configured to overlap with the registration sensors and the density sensors. Also, the overall number of sensors, or the respective number of the registration sensors and the density sensors, can be more or fewer than the present embodiment (this may be a singular number overall).

<Holding Member>

The holding member 111, as shown in FIG. 6, accommodates the registration sensors 113 and the density sensors 114. In the present embodiment, the holding member 111 is supported by the frame 115 so that the holding member 111 can be moved relative to the frame 115 of the casing 110. More specifically, as shown in FIG. 5, the holding member 111 is supported by the holding member support plate 116, which is fixed to the frame 115 of the casing 110, via a support spring 121 constituted by the compressed coil spring which is an elastic member as an urging means. As a result, the holding member 111 is supported by the frame 115 so that the holding member 111 is movable in the approximately vertical direction relative to the surface of the intermediary transfer belt 31.

Further, sensor positioning portions **111*b* are provided on the end portion of the holding member 111 in the front back direction. Also, during mounting of the sensor unit 101 on the main assembly 2, the sensor positioning portions 111*b* are abutted against an abutting portion (not shown) provided on the belt unit 3 by the pressure of the support spring 121. As a result, a distance between the registration sensors 113 and the density sensors 114, which are accommodated by the holding member 111, and the surface of the intermediary transfer belt 31 is kept constant. The aforementioned abutting portion is, for example, provided on the rotational axis of the backup roller 34 which is disposed on the inner circumferential surface of the intermediary transfer belt 31. For example, the abutting portion is a bearing which rotatably supports the backup roller 34**.

<Shutter Member>

Figure 7:
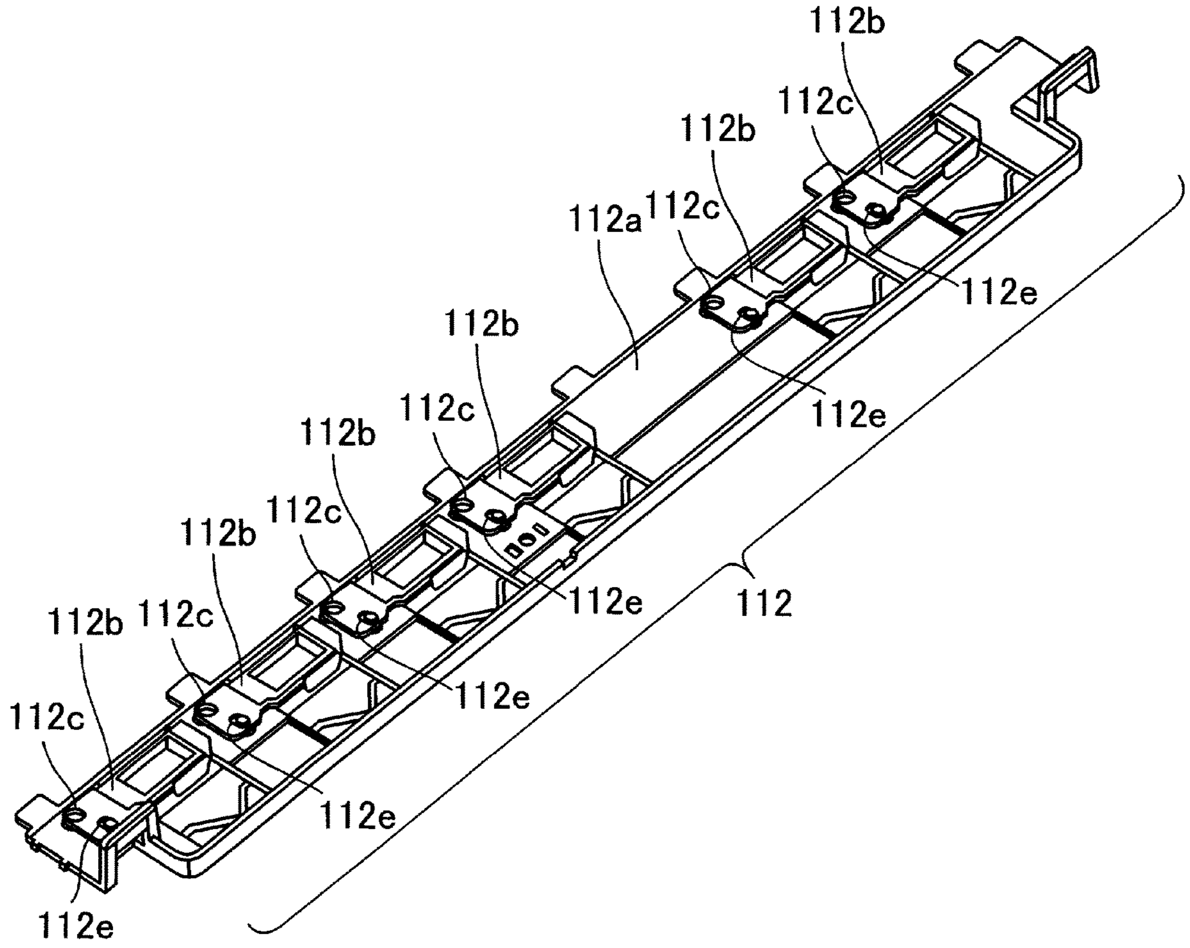
FIG. 7 is a perspective view of a shutter member in a closed state.
Figure 8:
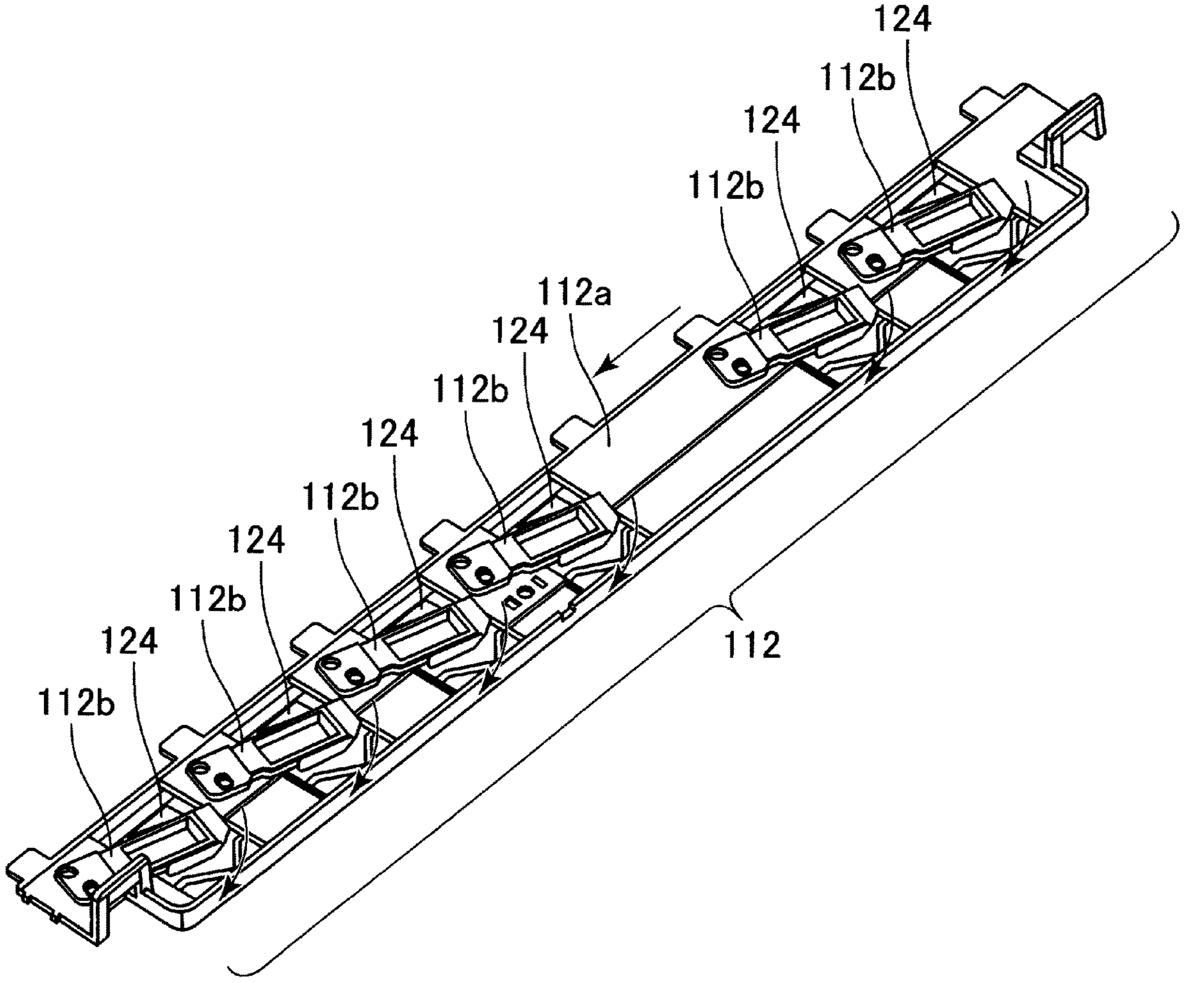
FIG. 8 is a perspective view of the shutter member in an open state.
Figure 9:
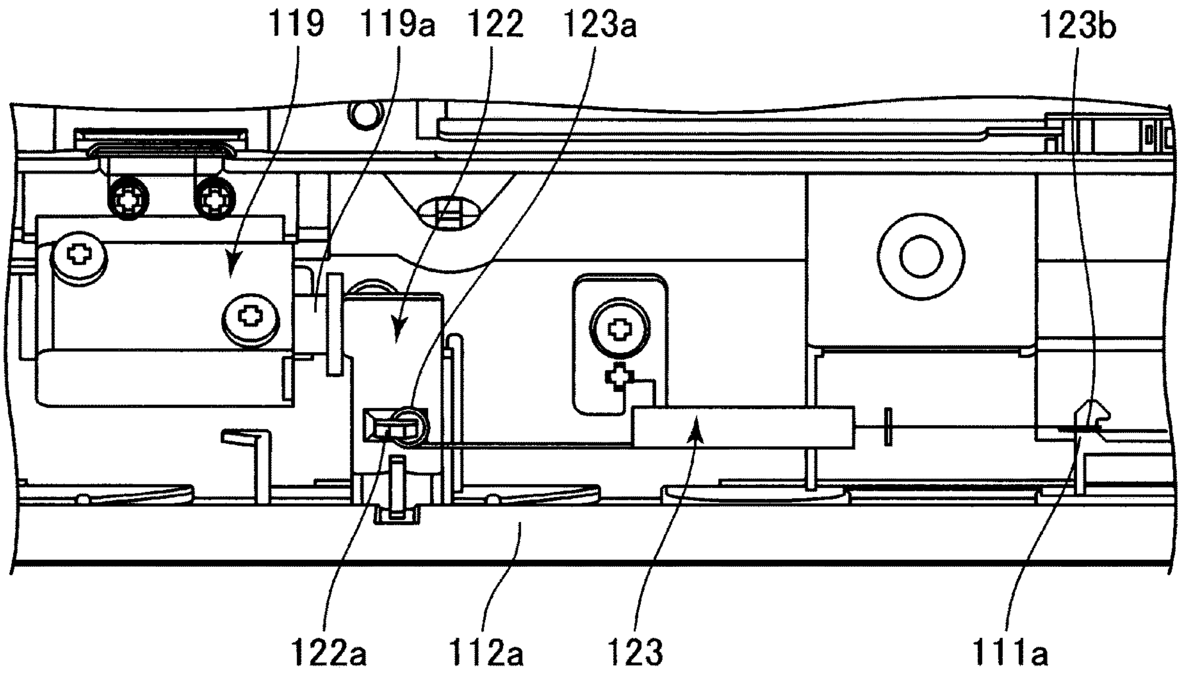
FIG. 9 is a side view of the periphery of a transmission member during the closed state of an opening/closing mechanism of the shutter member.
Figure 10:
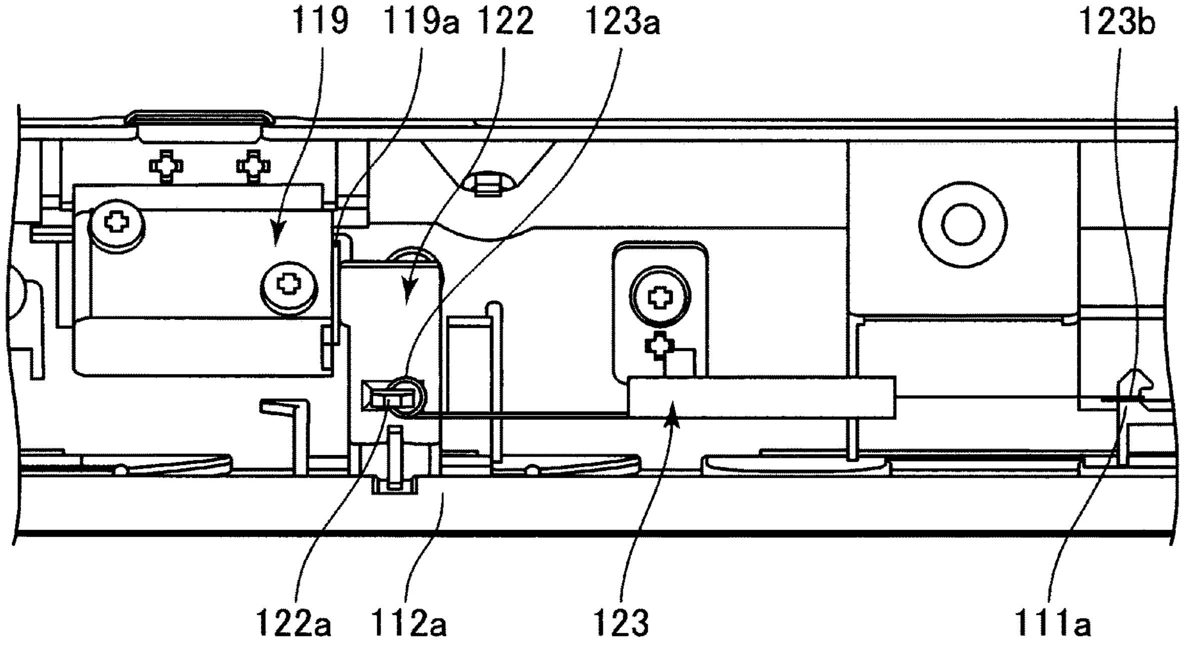
FIG. 10 is a side view of the periphery of the transmission member during the open state of the opening/closing mechanism of the shutter member.

FIGS. 7 and 8 are perspective views of the shutter member 112, as seen from the registration sensors 113 and the density sensors 114 (from the inside of the casing 110). FIG. 7 shows the shutter member 112 in a closing position which will be described later, and FIG. 8 shows the shutter member 112 in an opening position which will be described later. Further, FIGS. 9 and 10 are side views of a portion of the inside of the sensor unit 101 showing an opening/closing mechanism of the shutter member 112, as seen from the right side. FIG. 9 shows the shutter member 112 in the closing position which will be described later, and FIG. 10 shows the shutter member 112 in the opening position which will be described later.

In the present embodiment, the shutter member (an anti-fouling member) 112 is configured to include, as shown in FIGS. 7 and 8, the slide shutter **112*a* as a first shutter member, and rotating shutters 112*b* as second shutter members. In the present embodiment, the shutter member 112 is supported by the holding member 111 and disposed between the detecting surfaces 120 of the registration sensors 113 and the density sensors 114 and the surface of the intermediary transfer belt 31. Incidentally, the shutter member 112 can be supported by the casing 110 (the frame 115 etc.). That is, the shutter member 112 may be supported by the holding body 102, which is constituted by the casing 110 and the holding member 111 etc. Also, the shutter member 112 is movable between the opening position (the first position) where the detecting surfaces 120 are exposed to the surface of the intermediary transfer belt 31 and the closing position (the second position) where the detecting surfaces 120 are covered to the surface of the intermediary transfer belt 31**.

Further, the shutter member 112 is driven by the solenoid 119 as a driving source (a driving portion). In the present embodiment, the solenoid 119 is supported by the holding member 111. Incidentally, the solenoid 119 can be supported by the casing 110 (the frame 115 etc.). That is, the solenoid 119 may be supported by the holding body 102 which is constituted by the casing 110 and the holding member 111 etc.

Figure 11:
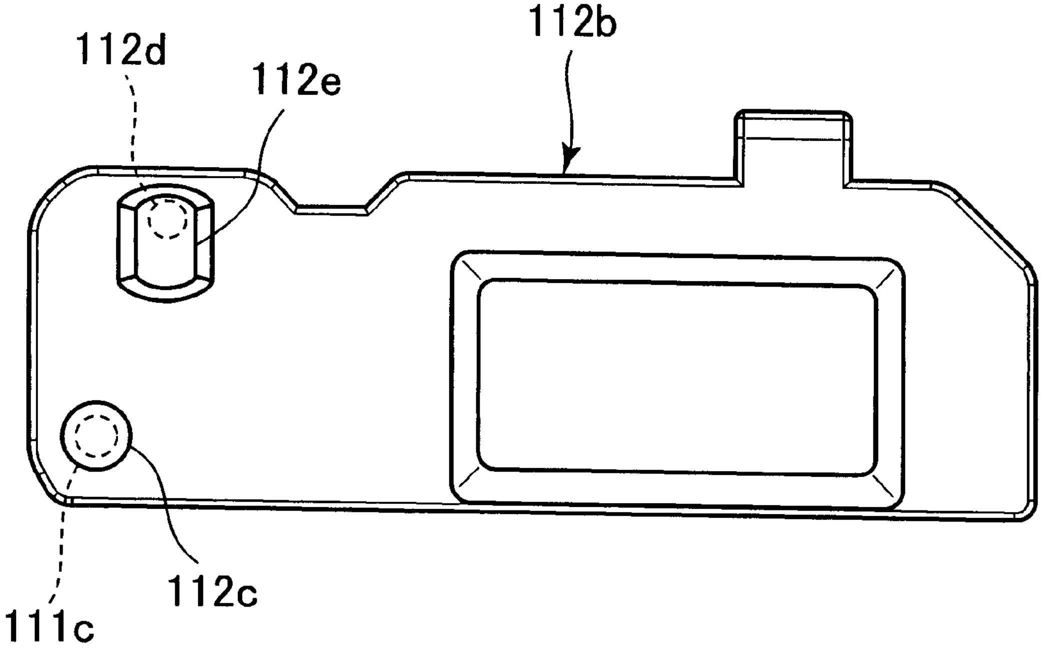
FIG. 11 is a plane view of a rotating shutter.

As shown in FIGS. 10 and 11, the driving force from the solenoid 119 is transmitted to the shutter member 112 via a transmission member (a linking member). That is, the sensor unit 101 includes a plunger **119*a* as a movable portion which is provided on the solenoid 119 and a transmission member 122 (a shutter mounting portion) which, along with the plunger 119*a*, is connected to the slide shutter 112*a* of the shutter member 112 and is movable. In the present embodiment, a portion of the transmission member 122 is fixed to the plunger 119*a*, and the other portion of the transmission member 122 is demountably fixed to the slide shutter 112*a* of the shutter member 112, as described later. A first spring mounting portion 122*a* is provided on the transmission member 122, and a first end portion 123*a*, which is one end portion of the shutter spring 123 constituted by a tension coil spring that is an elastic member as an urging means, is mounted on the first spring mounting portion 122*a*. Further, in the present embodiment, a second spring mounting portion 111*a* is provided on the holding member 111, and a second end portion 123*b*, which is the other end portion of the shutter spring 123, is mounted on the second spring mounting portion 111*a***.

When current flows to the solenoid 119, the plunger **119*a* of the solenoid 119 is attracted to the inside of the solenoid 119, and the transmission member 122 moves in interrelation toward the left side (the front side) in FIG. 9. This movement is then transmitted to the shutter member 112, and the shutter member 112 moves to the opening position shown in FIGS. 8 and 10. Further, when current to the solenoid 119 is stopped, the plunger 119*a* of the solenoid 119 is no longer attracted, and the transmission member 122 is pulled by the shutter spring 123, causing the transmission member 122 to move toward the right side (the back side) in FIG. 10. This movement is then transmitted to the shutter member 112, and the shutter member 112 moves (returns) to the closing position shown in FIGS. 7 and 9. By using the shutter spring 123 which urges the shutter member 112 from the opening position toward the direction of the closing position, the shutter member 112 can be maintained in the closing position even in a state in which electric supply to the solenoid 119** is stopped.

Here, the second end portion **123*b* of the shutter spring 123 can be mounted anywhere other than the shutter member 112 (the slide shutter 112*a* in the present embodiment) or the transmission member 122. In the present embodiment, the second spring mounting portion 111*a* is provided on the holding member 111; however, the second spring mounting portion can be provided on, for example, the casing 110 (the frame 115 etc.). That is, the second spring mounting portion 111*a* may be provided on the holding body 102, which is constituted by the casing 110 and the holding member 111** etc.

With reference to FIGS. 7 and 8, in the present embodiment, the slide shutter **112*a* is a member which includes a long approximate rectangular plate shape in the width direction of the intermediary transfer belt 31. Further, in the present embodiment, the rotating shutters 112*b* are respectively disposed on the registration sensors 113 and the density sensors 114**.

The slide shutter 112*a* as a moving member is slide movably mounted on the holding member 111 in the direction (the width direction of the intermediary transfer belt 31) intersecting (approximately perpendicular in the present embodiment) the movable direction of the surface of the intermediary transfer belt 31. The slide shutter 112*a* includes detection opening portions 124 which are opening portions which expose the detecting surfaces 120 of the registration sensors 113 and the density sensors 114 to the intermediary transfer belt 31. In other words, in a case in which the slide shutter 112*a* moves to the opening position, the detection opening portions 124 face the detecting surfaces 120 (FIG. 8). Further, in a case in which the slide shutter 112*a* moves to the closing position, the detection opening portions 124 deviate from the position facing the detecting surfaces 120 (FIG. 7). Incidentally, in the present embodiment, the detection opening portions 124 are configured to deviate from a portion of the detecting surfaces 120 in the case in which the slide shutter 112*a* moves to the closing position. However, the detection opening portions 124 can be configured to deviate from the entirety of the detecting surfaces 120 in the case in which the slide shutter 112*a* moves to the closing position. Further, in the present embodiment, the detection opening portions 124 are configured to expose the entirety of the detecting surfaces 120 to the intermediary transfer belt 31 in the case in which the slide shutter 112*a* moves to the opening position. However, in the case in which the slide shutter 112*a* moves to the opening position, the detection opening portions 124 can be configured to expose a portion of the detecting surfaces 120 to the intermediary transfer belt 31. The detection opening portions 124 may be detectable by the registration sensors 113 and the density sensors 114.

The rotating shutters 112*b* as covering members are supported to be rotatable and demountable by the holding member 111, and rotate in interrelation with the movement of the slide shutter 112*a*. FIG. 11 is a plane view of one rotating shutter 112*b*, as seen from the slide shutter 112*a* (the exterior of the casing 110). In the present embodiment, a rotation shaft 111*c* is provided on the holding member 111, and rotation holes 112*c* which rotatably fit to the rotation shaft 111*c* are provided on the rotating shutters 112*b*. Further, in the present embodiment, engagement bosses 112*d* are provided on the slide shutter 112*a*, and engagement holes 112*e* to which the engagement bosses engage are provided on the rotating shutters 112*b*. When the slide shutter 112*a* slide moves (linear moves) in the width direction of the intermediary transfer belt 31, the engagement bosses 112*d* engage with the engagement holes 112*e*, and the rotating shutters 112*b* rotate (rotationally move) around the rotation shaft 111*c* and the rotation holes 112*c*. In a case in which the slide shutter 112*a* moves to the opening position, the rotating shutters 112*b* deviate from the position in which the rotating shutters 112*b* cover (face) the detection opening portions 124 (FIG. 8). Further, in the case in which the slide shutter 112*a* moves to the closing position, the rotating shutters 112*b* cover (face) the detection opening portions 124 (FIG. 7). Incidentally, in the present embodiment, the rotating shutters 112*b* are configured to cover the entirety of the detection opening portions 124 in a case in which the rotating shutters 112*b* move to the closing position. However, the rotating shutters 112*b* can be configured to cover a portion of the detection opening portions 124 in the case in which the rotating shutters 112*b* move to the closing position. The detecting surfaces 120 may have sufficient antifouling. Further, in the present embodiment, the rotating shutters 112*b* are configured to deviate from a portion of the detection opening portions 124 in a case in which the rotating shutters 112*b* move to the opening position. However, the rotating shutters 112*b* can be configured to deviate from the entirety of the detection opening portions 124 in the case in which the rotating shutters 112*b* move to the opening position. The rotating shutters 112*b* may be detectable by the registration sensors 113 and the density sensors 114.

This configuration allows the shutter member 112 in the closing position (a closed state) to suppress toner from adhering to the detecting surfaces 120 of the registration sensors 113 and the density sensors 114. Further, the shutter member 112 in the opening position (an open state) can be configured to so that the registration sensors 113 and the density sensors 114 detect the toner image on the intermediary transfer belt 31.

4. Demounting of Shutter Member

When the shutter member 112 is closed, the detecting surfaces 120 of the registration sensors 113 and of the density sensors 114 are covered by the shutter member 112, and toner adhesion is prevented. However, when the registration patch and the density patch are respectively read from the registration sensors 113 and the density sensors 114, the detecting surfaces 120 of the registration sensors 113 and the density sensors 114 are exposed to the surface of the intermediary transfer belt 31. For example, even in a case in which the time during which the shutter member 112 is open is shortened, it is difficult to avoid gradual fouling of the detecting surfaces 120 of the registration sensors 113 and the density sensors 114 by toner. If the detecting surfaces 120 of the registration sensors 113 and the density sensors 114 are stained with toner, it becomes difficult to correctly read the registration patch and the density patch. As a result, it becomes difficult to correctly perform color misregistration correction and density correction, leading to image defects. For this reason, for example, it is necessary to regularly perform cleaning of the detecting surfaces 120. Also, during the aforementioned cleaning, it is necessary to expose the detecting surfaces 120, which requires the shutter member 112 to be demounted from the holding body 102.

At this time, in a case in which one end portion of the elastic member which urges the shutter member 112 is mounted on the shutter member 112, one end portion of the elastic member needs to be demounted from the shutter member 112 and remounted each time cleaning is performed. Such demounting and remounting of the elastic member may lead to a decrease in workability (work efficiency) due to an increase in the number of steps. Further, performing such work may lead to an increase in the risk of damaging parts during the task, such as deformation of the elastic member.

Incidentally, the same can be said for replacement work in a case in which the registration sensors 113 and the density sensors 114 are required to be replaced due to malfunctions etc.

Accordingly, in the present embodiment, as described above, the transmission member 122 is provided between the plunger 119*a* of the solenoid 119 and the shutter member 112 (the slide shutter 112*a* in the present embodiment). Also, in the present embodiment, the first end portion 123*a*, which is one end portion of the shutter spring 123, is mounted on the first spring mounting portion 122*a* provided on the transmission member 122.

Figure 12:
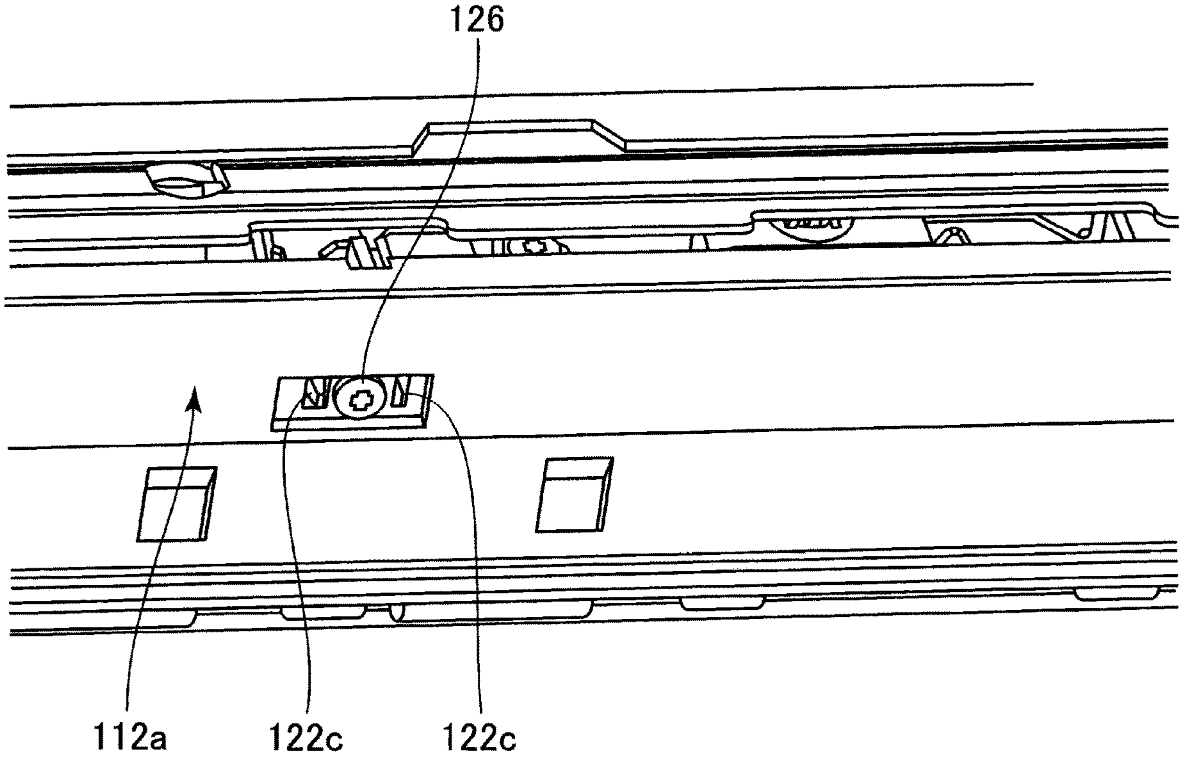
FIG. 12 is a perspective view of the sensor unit to explain mounting/demounting of the shutter member.
Figure 13:
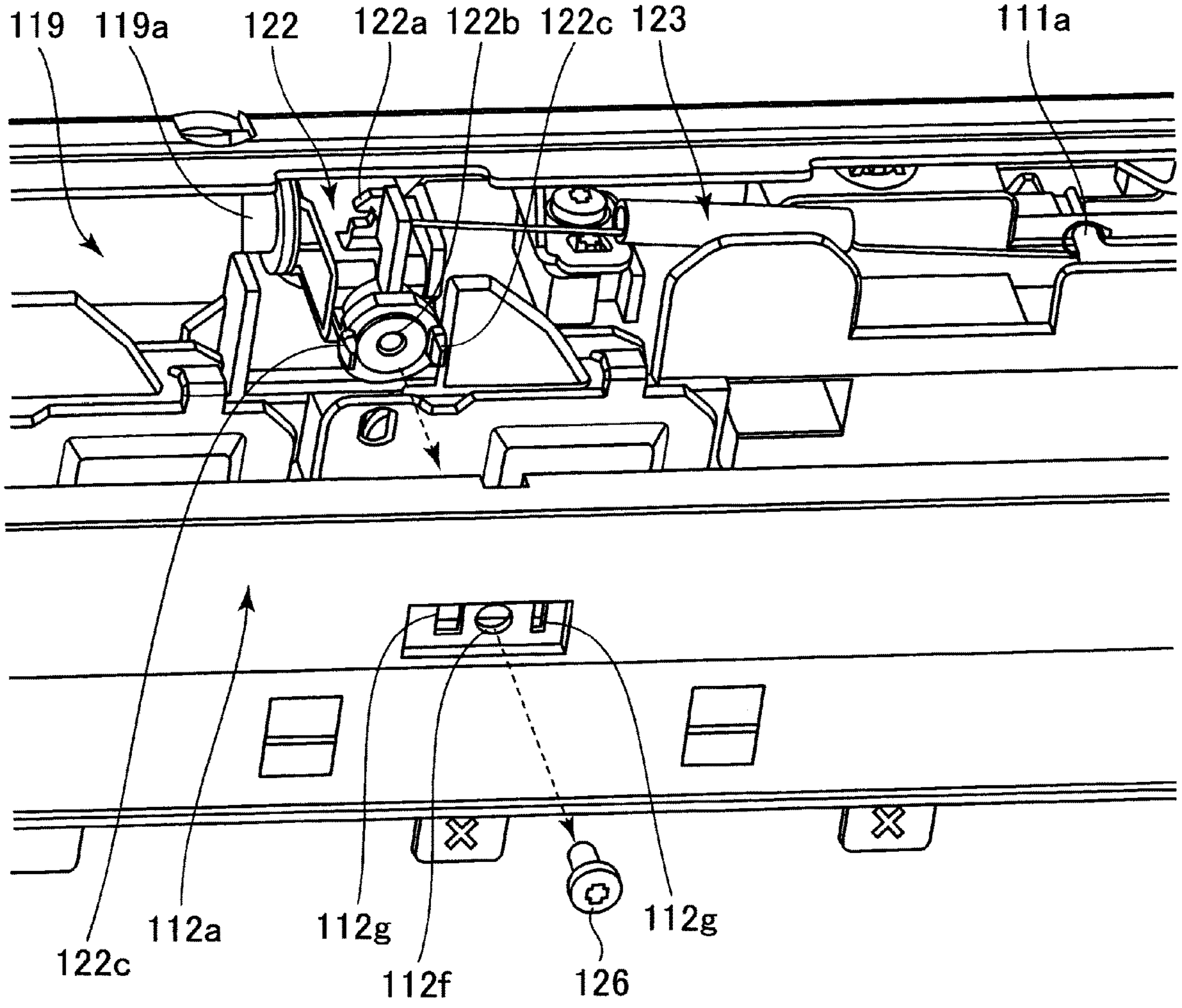
FIG. 13 is a perspective view of the sensor unit to explain mounting/demounting of the shutter member.

FIGS. 12 and 13 are perspective views of a portion of the sensor unit 101, as seen from the intermediary transfer belt 31, to explain the demounting of the shutter member 112 (the slide shutter 112*a*) in the present embodiment. FIG. 12 shows the shutter member 112 (the slide shutter 112*a*) in a mounted state on the holding body 102, and FIG. 13 shows the shutter member 112 (the slide shutter 112*a*) in a demounted state from the holding body 102.

As shown in FIG. 13, a screw hole 122*b* as a shutter fixing portion which constitutes a connecting portion that demountably connects the transmission member 122 to the shutter member 112 is provided on the transmission member 122. Regarding the normal direction of the surface of the intermediary transfer belt 31 for the position in which the registration patch and the density patch are detected by the registration sensors 113 and the density sensors 114, the screw hole 122*b* is provided more on the surface side (the outside of the shutter member 112 and the casing 110) of the intermediary transfer belt 31 than the first spring mounting portion 122*a* of the transmission member 122 and the second spring mounting portion 111*a* of the holding member 111. Further, a fixing hole 112*f* is provided on the slide shutter 112*a*. By passing a screw 126 as a fixing member through the fixing hole 112*f* of the slide shutter 112*a* and screwing the screw 126 together with the screw hole 122*b* of the transmission member 122, the slide shutter 112*a* can be fixed to the transmission member 122, as shown in FIG. 12. At this time, the slide shutter 112*a* may be configured to be accommodated by the holding member 111 by movably and demountably engaging the slide shutter 112*a* to an engagement portion provided on the holding member 111.

With such a configuration, as shown in FIGS. 12 and 13, the slide shutter 112*a* can be demounted from the holding member 111 while the shutter spring 123 is hung on the transmission member 122. That is, in the present embodiment, the slide shutter 112*a* can be demounted from the holding member 111 without demounting the first end portion 123*a* of the shutter spring 123 from the first spring mounting portion 122*a* provided on the transmission member 122. At this time, the second end portion 123*b* of the shutter spring 123 is also left mounted on the second spring mounting portion 111*a* of the holding member 111. As a result, a decrease in workability and an increase in the risk of damaging parts during the tasks as described above can be suppressed. Therefore, cleaning and exchange work as described above can be performed efficiently and easily.

To explain further, when demounting the shutter member 112 from the holding body 102, the sensor unit 101 is demounted from the main assembly 2 and disposed so that the shutter member 112 side faces upward. The screw 126 is then demounted from the screw hole 122*b* of the transmission member 122, and the slide shutter 112*a* is demounted from the transmission member 122 (FIGS. 12 and 13). At this time, the engagement bosses 112*d* of the slide shutter 112*a* are pulled out of the engagement holes 112*e* of the rotating shutters 112*b* (FIG. 11). The detecting surfaces 120 of the registration sensors 113 and the density sensors 114 can then be exposed by demounting the rotating shutters 112*b* from the holding member 111 (FIG. 11) by pulling the rotation shaft 111*c* of the holding member 111 out of the rotation holes 112*c* of the rotating shutters 112*b*. In this way, it is not necessary to demount the shutter spring 123 to expose the detecting surfaces 120 of the registration sensors 113 and the density sensors 114.

Further, when mounting the shutter member 112 to the holding body 102, the rotating shutters 112*b* are mounted on the holding member 111 (FIG. 11) by fitting the rotation holes 112*c* of the rotating shutters 112*b* to the rotation shaft 111*c* of the holding member 111 which faces upward as described above. At this time, the rotating shutters 112*b* are disposed in the closing position where the detecting surfaces 120 of the registration sensors 113 and the density sensors 114 are covered. Each of the engagement bosses 112*d* of the slide shutter 112*a* are then inserted into the engagement holes 112*e* of each of the rotating shutters 112*b* (FIG. 11), while at the same time, the position of the fixing hole 112*f* of the slide shutter 112*a* is aligned with the position of the screw hole 122*b* of the transmission member 122 (FIG. 13). Here, in the present embodiment, as shown in FIG. 13, positioning protrusions 122*c* are provided on the transmission member 122 adjacent to the screw hole 122*b*. In the present embodiment, two positioning protrusions 122*c* are provided interposing the screw hole 122*b*. Further, positioning holes 112*g* are provided on the slide shutter 112*a* adjacent to the fixing hole 112*f* In the present embodiment, two positioning holes 112*g* are provided interposing the fixing hole 112*f*. As a result, by fitting the positioning holes 112*g* to the positioning protrusions 122*c*, each of the engagement holes 112*e* are inserted into each of the engagement bosses 112*d* as described above, while at the same time, aligning the position of the fixing hole 112*f* with the position of the screw hole 122*b* is facilitated. The slide shutter 112*a* is then fixed to the transmission member 122 by the screw 126 (FIG. 12). In this way, when mounting the shutter member 112 to the holding body 102, it is not necessary to mount the shutter spring 123.

In this way, in the present embodiment, the image forming apparatus 100 is disposed between the sensors 113 and 114 which detect the toner image on the surface of the moving member (intermediary transfer belt) 31, and the surfaces of the sensors 113 and 114 and the moving member 31, is demountably connected to the shutter member 112 which is movable between the opening position where the sensors 113 and 114 are exposed to the surface of the moving member 31 and the closing position where the sensors 113 and 114 are covered to the surface of the moving member 31, a driving source 119 which generates a driving force to cause the shutter member 112 to move, and the shutter member 112, and includes the transmission member 122 which transmits the driving force from the driving source 119 to the shutter member 112, an elastic member (shutter spring) 123 which urges the shutter member 112 from the opening position in the direction toward the closing position, and the holding body 102 which accommodates the sensors 113 and 114, the shutter member 112, the driving source 119, the transmission member 122, and the elastic member 123. The first end portion 123*a* of the elastic member 123 is mounted on the transmission member 122, and the second end portion 123*b* which is opposite the aforementioned first end portion 123*a* of the elastic member 123 is mounted on the holding body 102. In the present embodiment, regarding the normal direction of the surface of the moving member 31 in a position where the aforementioned toner image is detected by the sensors 113 and 114, the transmission member 122 includes a connecting portion (screw hole) 122*b*, which is demountably connected to the shutter member 112 more toward the surface side of the moving member 31 than the first spring mounting portion 122*a* to which the aforementioned first end portion 123*a* of the transmission member 122 is mounted and the second spring mounting portion 111*a* to which the aforementioned second end portion 123*b* of the holding body 102 is mounted. Further, in the present embodiment, the shutter member 112 includes a first shutter member (slide shutter) 112*a* which is disposed between the surfaces of the sensors 113 and 114, and the moving member 31, and is movable along the direction intersecting the movable direction of the moving member 31, and a secondary shutter member (rotating shutter) 112*b* which is disposed between the sensors 113 and 114 and the first shutter member 112*a*, and is rotatable with the movement of the first shutter member 112*a*, and the transmission member 122 is demountably connected to the first shutter member 112*a*. Further, in the present embodiment, the transmission member 122 is movable along the direction intersecting the movable direction of the moving member 31. Further, in the present embodiment, the driving source 119 is constituted by the solenoid. Further, in the present embodiment, the elastic member 123 is constituted by the tension coil spring. However, for the elastic member 123, other forms such as a compressed coil spring can be used by changing the disposition of the first and second spring mounting portions 122*a* and 111*a* as appropriate etc. Further, in the present embodiment, the holding body 102 is demountable from the main assembly 2 of the image forming apparatus 100. Further, in the present embodiment, the moving member 31 is constituted by the endless belt stretched by a plurality of stretching rollers.

As described above, according to the present embodiment, the number of parts to be mounted and demounted to access the sensors 113 and 114 of the sensor unit 101 for cleaning etc. can be decreased. For this reason, according to the present embodiment, the workability of tasks to access the sensors 113 and 114 of the sensor unit 101 for cleaning etc. can be improved. Further, according to the present embodiment, the risk of damaging parts during tasks to access the sensors 113 and 114 of the sensor unit 101 for cleaning etc. can be decreased.

Embodiment 2

Next, another embodiment of the present invention will be described. The basic configuration and operations of the image forming apparatus of the present embodiment are the same as the image forming apparatus in the first embodiment. Therefore, for the image forming apparatus of the present embodiment, the same reference numerals as the first embodiment will be used and descriptions will be omitted for the same element or an element including a corresponding function or configuration as the image forming apparatus of the first embodiment.

Figure 14:
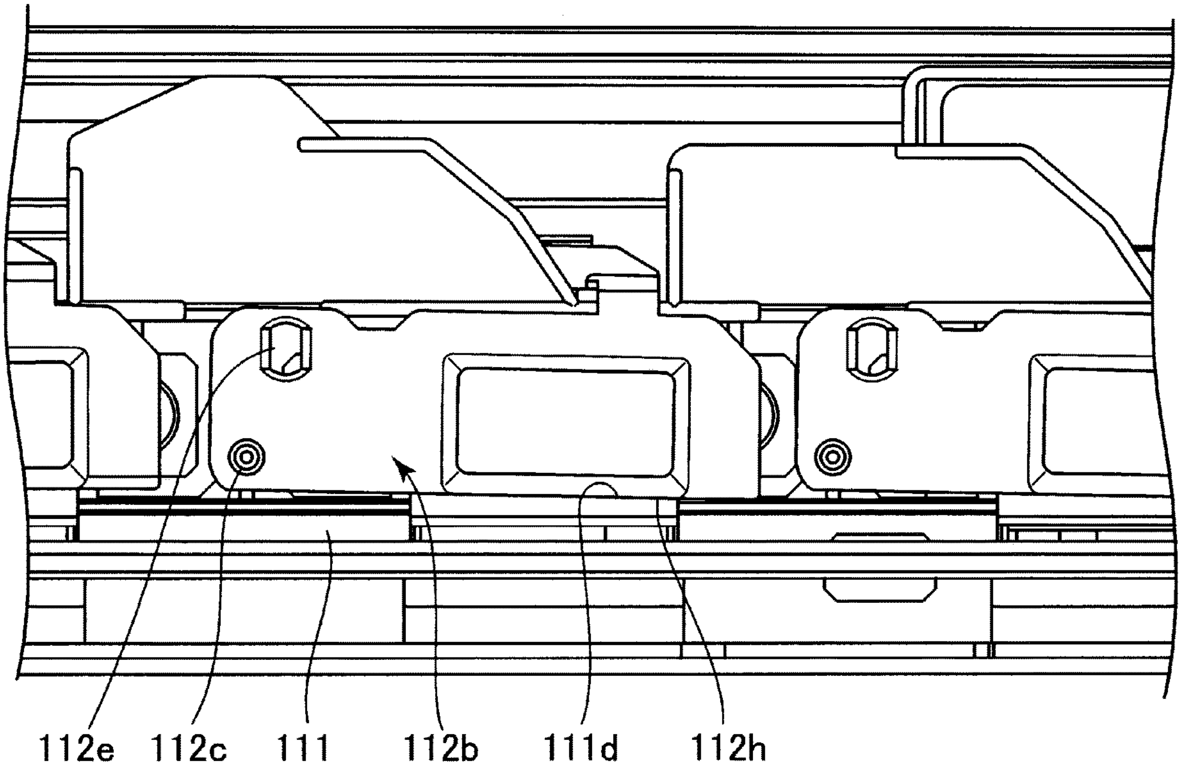
FIG. 14 is a plane view of a portion of the shutter member to explain a shutter restricting portion.

In the present embodiment, when the shutter member 112 is in a mounted state on the holding body 102, the sensor unit 101 is configured such that a portion of the shutter member 112 abuts the holding member 111 when the shutter member 112 is moved to the closing position. FIG. 14 is an expanded plane view of one rotating shutter 112*b* in the closing position in the present embodiment, as seen from the intermediary transfer belt 31. In FIG. 14, the illustration of the slide shutter 112*a* has been omitted. In the present embodiment, when the shutter member 112 moves to the closing position, a side surface 112*h*, which is on the downstream side of the rotatable direction toward the closing position of the rotating shutters 112*b*, abuts a shutter abutting portion 111*d* (also referred to a shutter restricting portion 111*d*) which is provided on the holding member 111. As a result, the position of the shutter member (the slide shutter 112*a*, the rotating shutters 112*b*) in the closing position is determined. Incidentally, the position of the shutter member 112 which is in the closing position may be determined by at least one of a plurality of rotating shutters 112*b* abutting the shutter abutting portion 111*d*. When the shutter member 112 is in a mounted state on the holding body 102, the shutter abutting portion 111*d* constitutes a shutter restricting portion which restricts the position of the shutter member 112 which is urged by the shutter spring 123 and moves from the opening position in the direction toward the closing position. With such a configuration, the position of the shutter member 112 in the closing position can be fixed each time the shutter member 112 moves to the closing position. As a result, stable anti-fouling of the detecting surfaces 120 can be maintained, and the risk of the occurrence of an image defect caused by color misregistration correction and density correction being incorrectly performed due to toner contamination on the detecting surfaces 120 can be decreased.

Incidentally, the portion which abuts the shutter abutting portion on the shutter member 112 is not limited to being provided on the rotating shutters 112*b*, and can be provided on the slide shutter 112*a*. For example, the configuration can be such that the tip of the slide shutter 112*a* moving to the closing position abuts the shutter abutting portion which is provided on the holding member 111. Further, the shutter abutting portion which is abutted by the shutter member 112 is not limited to being provided on the holding member 111, and can be provided on the casing 110 (the frame 115 etc.). That is, the shutter abutting portion may be provided by the holding body 102 which is constituted by the casing 110 and the holding member 111 etc.

Figure 15:
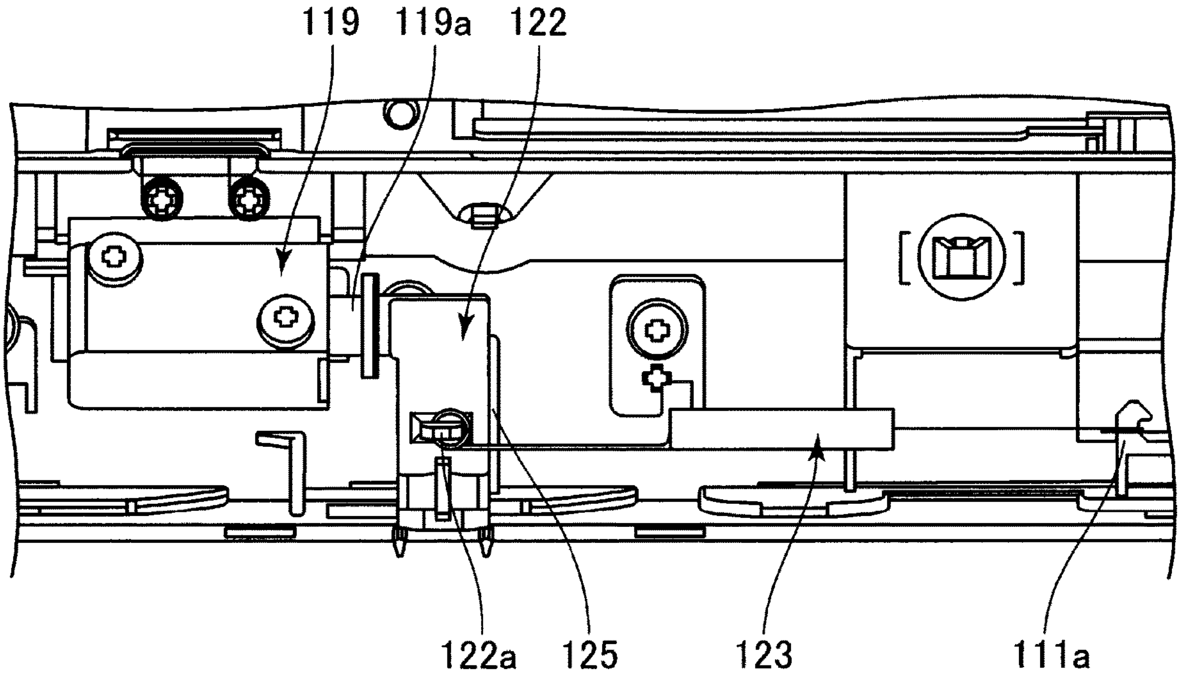
FIG. 15 is a side view of the periphery of the transmission member to explain a transmission member restricting portion.

On the other hand, in the present embodiment, the sensor unit 101 is configured such that, when the shutter member 112 is demounted from the holding body 102 and the transmission member 122 is pulled by the shutter spring 123, the transmission member 122 abuts the holding member 111. That is, the solenoid 119 is configured so that the plunger 119*a* can be pulled out. In such a configuration, in a case in which the movement of the transmission member 122 is not restricted in a state in which the shutter member 112 is in a demounted state from the holding body 102, the transmission member 122 may be pulled by the shutter spring 123 and may fall off. FIG. 15 is a side view of a portion of the inside of the sensor unit 101, as seen from the right side, where the shutter member 112 in the present embodiment is in a demounted state from the holding body 102. In the present embodiment, a transmission member abutting portion 125 (also referred to a transmission member restricting portion 125), which is abutted by the transmission member 122 when the shutter member 112 is demounted from the holding member 111 and the transmission member 122 is pulled by the shutter spring 123, is provided on the holding member 111. When the shutter member 112 is in a demounted state from the holding body 102, the transmission member abutting portion 125 constitutes a transmission member restricting portion which restricts the position of the transmission member 122, which is urged by the shutter spring 123. In the present embodiment, the transmission member abutting portion 125 is configured to be wall-shaped. As a result, the transmission member 122 can be prevented from falling off due to an urging force of the shutter spring 123. In addition, because the transmission member 122 is fixed to be pushed against the transmission member abutting portion 125 by the urging force of the shutter spring 123, when the shutter member 112 is mounted on the holding body 102, the task can be performed in a stable state. As a result, mounting of the shutter member 112 on the holding body 102 is facilitated.

Incidentally, the transmission member abutting portion which is abutted by the transmission member 122 is not limited to being wall-shaped, and, for example, can be a shaft shape or a rib shape which is abutted by a single or a plurality of contact portions.

Figure 16:
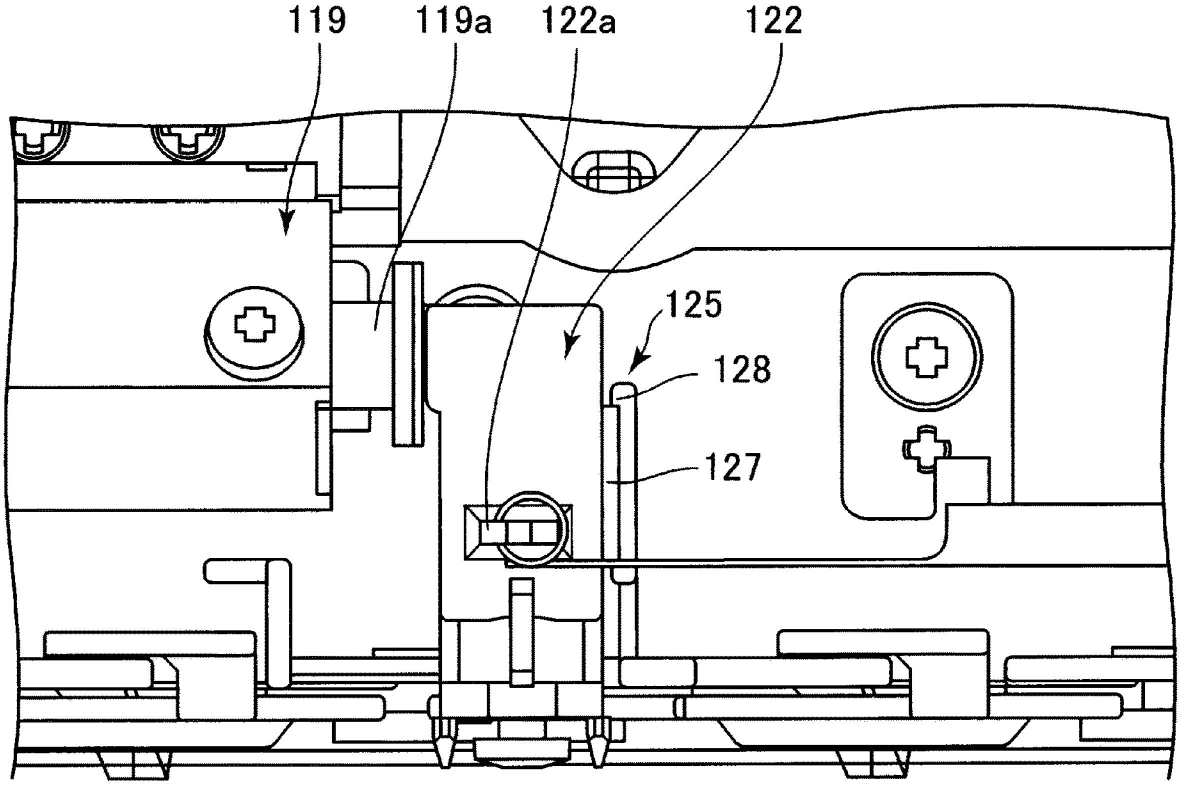
FIG. 16 is a side view of the periphery of the transmission member showing another example of the transmission member restricting portion.

Further, as shown in FIG. 16, the transmission member restricting portion 125 can be configured to include a receiving portion 128 which receives force from the transmission member 122 corresponding to the aforementioned transmission member abutting portion, and a cushioning material 127 which is disposed between the transmission member 122 and the receiving portion 128. The cushioning material 127 can be fixed to the surface of the receiving portion 128 on the transmission member 122 side. As a result, a collision sound which arises when the transmission member 122 abuts the transmission member abutting portion can be reduced. An elastic member or a flexible member, such as sponge constituted by foamed rubber (a resistance foamed elastic body), and felt or non-woven fabric constituted by fabric including elasticity or flexibility, can be used for the cushioning material 127. Incidentally, FIG. 16 is an expanded side view of the periphery of the transmission member 122 of the sensor unit 101 in which the cushioning material 127 has been provided, as seen from the right side.

Here, in the present embodiment, as described above, when the shutter member 112 is in a mounted state on the holding body 102, determining the position of the shutter member 112 causes the transmission member 122 to be at rest. On the other hand, in the present embodiment, as described above, when the shutter member 112 is in a demounted state from the holding body 102, determining the position of the transmission member 122 causes the transmission member 122 to be at rest. In this way, in the present embodiment, the position in which the transmission member 122 is at rest when the transmission member 122 is pulled by the shutter spring 123 is different in a case in which the shutter member 112 is in a mounted state on the holding body 102, and in a case in which the shutter member 112 is in a demounted state from the holding body 102. That is, as described above, in the case in which the shutter member 112 is in a demounted state from the holding body 102, in other words, when connecting the transmission member 122 to the shutter member 112, the position of the shutter member 112 is determined by the transmission member 122. On the other hand, in the case in which the shutter member 112 is in a mounted state on the holding body 102, in other words, when the image forming apparatus 100 is in an operating state, it is preferable to improve the position accuracy of the shutter member 112 in the closed state, and to improve anti-fouling of the detecting surfaces 120 etc. In this state, in a case in which the configuration is such that determining the position of the transmission member 122 determines the position of the shutter member 112, depending on the extent of a normal dimension error in measurements of the shutter member 112 and the transmission member 122, the position accuracy of the shutter member 112 in the closed state may decrease.

For this reason, in the present embodiment, the position in which the transmission member 122 is at rest when the transmission member 122 is pulled by the shutter spring 123 is made to be different in the case in which the shutter member 112 is in a mounted state on the holding body 102 and in the case in which the shutter member 112 is in a demounted state from the holding body 102, as described above. However, the difference between the resting position of the transmission member 122 in the two aforementioned states is configured to be in a range which does not impede the operation of inserting each of the engagement bosses 112*d* into each of the engagement holes 112*e* while fitting the positioning holes 112*g* to the positioning protrusions 122*c* during the mounting described in the first embodiment.

Incidentally, although the description was omitted in the first embodiment, the transmission member restricting portion described in the present embodiment can be provided on the sensor unit 101 in the first embodiment. However, in a case in which the configuration is such that the plunger 119*a* cannot be pulled out, the transmission member restricting portion described in the present embodiment does not need to be provided on the sensor unit 101. For the configuration in which the plunger 119*a* cannot be pulled out, a configuration in which the solenoid 119 is provided to have a structure which prevents it from being pulled out, or a configuration in which the plunger 119*a* cannot be pulled out even when the shutter spring 123 is in a state of natural length are mentioned. Similarly, although the description was omitted in the first embodiment, the shutter restricting portion described in the present embodiment can be provided on the sensor unit 101 in the first embodiment.

In this way, in the present embodiment, the transmission member 122 is movable along the direction intersecting the movable direction of the moving member 31. Also, in the present embodiment, the holding body 102 includes the transmission member restricting portion 125 which restricts the position of the transmission member 122 which is urged by the elastic member 123 where the shutter member 112 is in a demounted state from the holding body 102. In the present embodiment, the transmission member restricting portion 125 is constituted by the abutting portion which is abutted by the transmission member 122. Further, the transmission member restricting portion 125 can be configured to include the receiving portion 128 which receives the force from the transmission member 122, and the cushioning material 127 which is disposed between the transmission member 122 and the receiving portion 128. Further, in the present embodiment, the holding body 102 includes a shutter restricting portion 111*d* when the shutter member 112 which is in a mounted state on the holding body 102 is urged by the elastic member 123 and restricts the position of the shutter member 112 which has moved from the opening position in the direction toward the closing position, and the position in which the transmission member 122 is at rest when the shutter member 112 is in a demounted state from the holding body 102 and the position of the transmission member 122 is restricted by the transmission member restricting portion 125 is different from the position in which the transmission member 122 is at rest when the shutter member 112 is in a mounted state on the holding body 102 and the position of shutter member 112 is restricted by the shutter restricting portion 111*d*.

As described above, according to the present embodiment, the same effect as the first embodiment can be obtained, while preventing the transmission member 122 from falling off the holding body 102 which may be caused by the configuration of the solenoid 119 etc. when the shutter member 112 is demounted from the holding body 102.

Embodiment 3

Next, another embodiment of the present invention will be described. The basic configuration and operations of the image forming apparatus of the present embodiment are the same as the image forming apparatus in the first embodiment. Therefore, for the image forming apparatus of the present embodiment, the same reference numerals as the first embodiment will be used and descriptions will be omitted for the same element or an element including a corresponding function or configuration as the image forming apparatus of the first embodiment.

Figure 17:
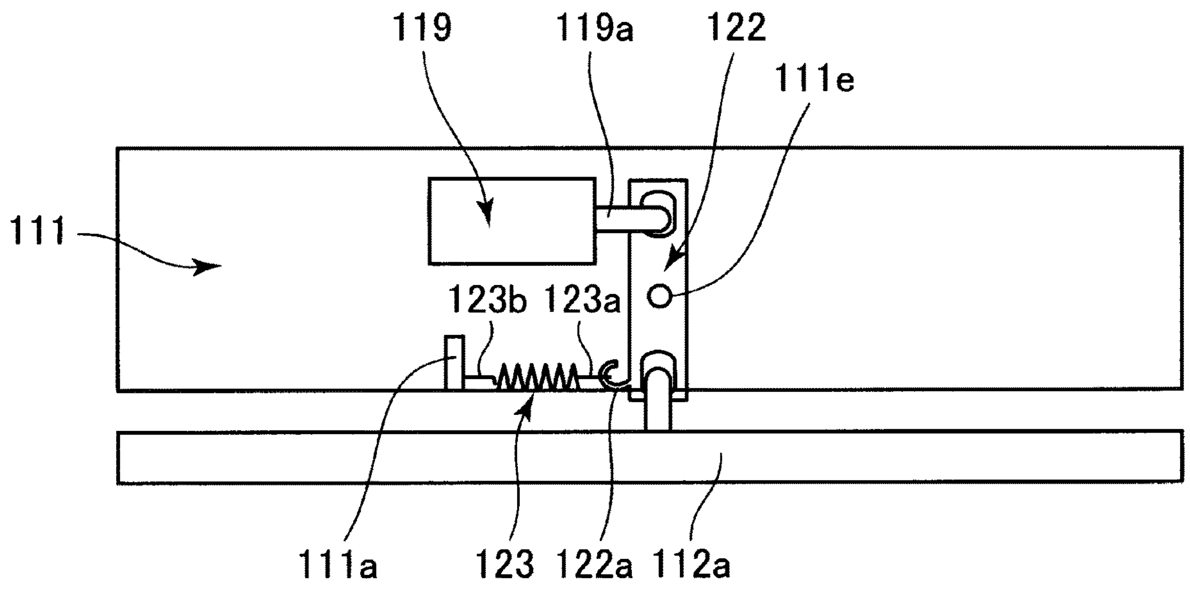
FIG. 17 is a schematic side view of the inside of another example of the sensor unit.

FIG. 17 is a schematic side view of the inside of the sensor unit 101 as seen from the right side, showing the opening/closing mechanism of the shutter member 112 of the sensor unit 101 in the present embodiment. In the present embodiment, the transmission member 122 is rotatably mounted on the holding member 111 around a transmission member rotation shaft 111*e* which is provided on the holding member 111. Also, the plunger 119*a* of the solenoid 119 is fixed to one end portion of the transmission member 122 interposing the transmission member rotation shaft 111*e*, and the first end portion 123*a* of the shutter spring 123 is mounted on the first spring mounting portion 122*a* which is provided on the other end portion. In this way, in the present embodiment, the transmission member 122 is rotatable around a center of rotation, and the first spring mounting portion 122*a* is provided opposite the solenoid 119 relative to the center of rotation. The second end portion 123*b* of the second shutter spring 123 is mounted on the second spring mounting portion 111*a* which is provided on the holding member 111. Further, in the present embodiment, the plunger 119*a* and the shutter spring 123 (the second spring mounting portion 111*a*) are disposed on the same side as the transmission member 122 in the opening/closing direction of the slide shutter 112*a* (the width direction of the intermediary transfer belt 31). In the present embodiment, the slide shutter 112*a* moves to the left side of FIG. 17 and is disposed in the closing position, and moves to the right side of FIG. 17 and is disposed in the opening position.

In this way, in the present embodiment, the transmission member 122 is rotatably supported by the holding body 102. As a result, even if the transmission member restricting portion described in the second embodiment is not provided, the transmission member 122 can be prevented from falling off. Further, by configuring the transmission member 122 to be rotatable, frictional resistance between the transmission member 122 and the holding member 111 can be reduced in comparison to a case in which the transmission member 122 is slide moved along the opening/closing direction of the slide shutter 112*a*. As a result, wear on the transmission member 122 from repeated use can be decreased, and the life of the transmission member 122 and the holding member 111 can be extended.

Incidentally, the solenoid 119 and the shutter spring 123 can be on the same side (the present embodiment) or the opposite side of the transmission member 122 in the opening/closing direction of the slide shutter 112*a*. In a case in which the solenoid 119 and the shutter spring 123 are on the opposite side of the transmission member 122, the shutter spring 123 can be constituted by compressed coil spring etc. and can be configured to urge the shutter member 112 from the opening position in the direction toward the closing position.

Others

The present invention has been described with reference to the specific embodiments; however, the present invention is not limited to the above embodiments.

In the aforementioned embodiment, the shutter member was configured to include the slide shutter (the first shutter member) and the rotating shutters (the second shutter member). As a result, the opening portion of the shutter member is sufficiently covered to the surface of the moving member, and a relatively high level of anti-fouling can be obtained. However, the present invention is not limited to such an embodiment. The shutter member, for example, can be constituted only by a member corresponding to the slide shutter. In this case, appropriate anti-fouling can also be obtained by moving the opening portion of the slide shutter to a position in which it deviates from the detecting surfaces of the sensors.

Further, in the aforementioned embodiment, the driving source of the shutter member was constituted by the solenoid; however, the present invention is not limited to such an embodiment. The driving source of the shutter member can be another form of a driving source, such as a motor, which generates the driving force to move the shutter member.

Further, in the aforementioned embodiment, the connecting portion between the transmission member and the shutter member was demountably fixed by the screw as a fixing member; however, the present invention is not limited to such an embodiment.

The connecting portion between the transmission member and the shutter member can be demountably fixed by another fixing means such as press fitting and snap fitting etc. Further, the connecting portion between the transmission member and the shutter member can be configured without fixing by the fixing methods as described above, but can be configured such that the transmission member and the shutter member are connected such that the driving force is transmissible by fitting or engagement, and such that the shutter member is movably and demountably accommodated by the holding body.

Further, in the aforementioned embodiment, a case was described in which the sensor unit detects the toner image for adjustment which is carried and conveyed on the intermediary transfer member as a moving member (a conveyance member); however, the present invention is not limited to such an embodiment. That is, in the aforementioned embodiment, the image forming apparatus was an image forming apparatus using the intermediary transfer method which first primary transfers the toner image formed on the image bearing member to the intermediary transfer member, then secondary transfers the toner image to the recording material. In contrast, there is an image forming apparatus using the direct transfer method which directly transfers the toner image formed on the image bearing member to the recording material conveyed by a recording material bearing member. The sensor unit can be a sensor unit that detects the toner image for adjustment which is carried and conveyed by the recording material bearing member as a moving member. Many endless belts similar to the intermediary transfer belt in the aforementioned embodiment are used as the recording material bearing member.

Further, in the aforementioned embodiment, the sensor unit included the density sensors and the registration sensors; however, the sensor unit can include only density sensors. Also, the sensor unit can be a sensor unit that detects the toner image for adjustment which is carried and conveyed by the photosensitive members or an electrostatic recording dielectric member as moving members. Further, the sensor unit can be a sensor unit which detects another suitable toner image for adjustment.

Further, the intermediary transfer member and the recording material bearing member as moving members are not limited to the endless belt, and for example, can be drum-shaped moving members etc. constituted by film (sheets) which are stretched on a frame. Further, the photosensitive members as moving members are not limited to being drum-shaped, and can be an endless belt etc.

According to the present invention, workability for accessing the sensor which detects the toner image on the surface of the moving member for cleaning etc. can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-181461 filed on Nov. 11, 2022, which is hereby incorporated by reference herein in its entirety.

What is claimed is:

1. An image forming apparatus comprising:

a moving member configured to carry a toner image and move;

a sensor configured to detect the toner image carried on a surface of the moving member;

a shutter movably supported between the sensor and the surface of the moving member, and movable to an opening position where the sensor is exposed to the surface of the moving member and a closing position where the sensor is covered to the surface of the moving member;

a driving source configured to generate a driving force to cause the shutter to move between the opening position and the closing position;

a shutter mounting portion to which the shutter is removably attached, the shutter mounting portion being constructed for movement integrally with movement of the shutter when the shutter moves between the opening position and the closing position; and an urging member configured to urge the shutter mounting portion.

2. An image forming apparatus according to claim 1, wherein the shutter is demountable from the shutter mounting portion in a state in which the urging member is mounted to the shutter mounting portion.

3. An image forming apparatus according to claim 1, further comprising a screw configured to demountably fix the shutter to the shutter mounting portion.

4. An image forming apparatus according to claim 1, further comprising a restricting portion configured to restrict a position of the shutter mounting portion by abutting on the shutter mounting portion in a case in which the shutter mounting portion is moved by being urged of the urging member in a state in which the shutter is demounted from the shutter mounting portion.

5. An image forming apparatus according to claim 4, further comprising a shutter restricting portion configured to restrict a position of the shutter by abutting on the shutter in a case in which the shutter mounting portion is moved by being urged of the urging member in a state in which the shutter is mounted on the shutter mounting portion.

6. An image forming apparatus according to claim 5, wherein a first position where the shutter is at rest in a case in which the shutter mounting portion is restricted by the restricting portion is different from a second position where the shutter mounting portion is at rest in a case in which the shutter is restricted by the shutter restricting portion.

7. An image forming apparatus according to claim 1, wherein the shutter is configured to move between the opening position and the closing position by the shutter mounting portion being driven by the driving source.

8. An image forming apparatus according to claim 1, further comprising a positioning portion provided on the shutter mounting portion and configured to position the shutter to the shutter mounting portion.

9. An image forming apparatus according to claim 1, wherein the moving member is constituted by an endless belt stretched by a plurality of stretching rollers.

10. An image forming apparatus according to claim 9, further comprising a casing portion configured to accommodate the sensor; and a holding member relatively and movably supported by the casing portion and configured to hold the sensor, wherein the shutter is relatively and movably held to the holding member.

11. An image forming apparatus according to claim 10, wherein one end portion of the urging member is fixed to the holding member.

* * * * *